(12) United States Patent
Bishop

(10) Patent No.: US 8,732,585 B2
(45) Date of Patent: May 20, 2014

(54) COMMUNITY INFORMATION UPDATES IN A SIDEBAR

(75) Inventor: Marc Bishop, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1105 days.

(21) Appl. No.: 11/434,354

(22) Filed: May 15, 2006

(65) Prior Publication Data

US 2007/0157108 A1 Jul. 5, 2007

Related U.S. Application Data

(63) Continuation-in-part of application No. 11/326,137, filed on Jan. 4, 2006.

(51) Int. Cl.
*G06F 15/177* (2006.01)
*G06F 3/048* (2013.01)

(52) U.S. Cl.
USPC .......................... 715/736; 715/810; 715/764

(58) Field of Classification Search
USPC ......... 715/733, 736, 243, 792, 779, 758, 741, 715/810, 743, 764; 709/224
See application file for complete search history.

(56) References Cited

U.S. PATENT DOCUMENTS

| | | | |
|---|---|---|---|
| 5,796,393 A | 8/1998 | MacNaughton et al. | |
| 5,878,219 A | 3/1999 | Vance, Jr. et al. | |
| 6,020,884 A | 2/2000 | MacNaughton et al. | |
| 6,055,570 A * | 4/2000 | Nielsen | 709/224 |
| 6,421,781 B1 * | 7/2002 | Fox et al. | 726/4 |
| 6,654,725 B1 | 11/2003 | Langheinrich et al. | |
| 6,654,786 B1 * | 11/2003 | Fox et al. | 709/203 |
| 6,756,997 B1 | 6/2004 | Ward et al. | |
| 7,177,859 B2 * | 2/2007 | Pather et al. | 707/3 |
| 7,325,204 B2 * | 1/2008 | Rogers | 715/792 |
| 7,343,567 B2 * | 3/2008 | Mann et al. | 715/826 |
| 7,373,139 B2 * | 5/2008 | Suzuki | 455/414.2 |
| 7,433,920 B2 * | 10/2008 | Blagsvedt et al. | 709/204 |
| 2002/0070965 A1 * | 6/2002 | Austin | 345/762 |
| 2002/0070968 A1 * | 6/2002 | Austin et al. | 345/764 |
| 2002/0082901 A1 | 6/2002 | Dunning et al. | |
| 2004/0212640 A1 | 10/2004 | Mann et al. | |
| 2005/0044058 A1 | 2/2005 | Matthews et al. | |
| 2005/0050301 A1 | 3/2005 | Whittle et al. | |
| 2005/0055645 A1 * | 3/2005 | Matthews et al. | 715/800 |
| 2005/0060655 A1 | 3/2005 | Gray et al. | |

(Continued)

OTHER PUBLICATIONS

Shahar, et al. "Intelligent Visualization and Exploration of Time-Oriented Clinical Data" In System Sciences, 1999. HICSS-32. Proceedings of the 32nd Annual Hawaii International Conference on System Sciences; 1999; vol. Track 4; 12 pages http://csdl2.computer.org/comp/proceedings/hicss/1999/0001/04/00014019.

(Continued)

*Primary Examiner* — Amy Ng
*Assistant Examiner* — Erik Stitt
(74) *Attorney, Agent, or Firm* — James J. DeCarlo; Greenberg Traurig, LLP

(57) ABSTRACT

Members of Internet community websites, such as for example, social networking sites, photo sharing sites, review site, and other community sites, regularly make updates to the websites. Therefore a member of those sites is constantly checking those sites for new updates. In one embodiment, an application module of a sidebar provides an indicator, such as, for example, a new item in the application module, to the sidebar user when an update is made to a community website by another member of the site.

30 Claims, 24 Drawing Sheets

(56) References Cited

U.S. PATENT DOCUMENTS

| | | | |
|---|---|---|---|
| 2005/0066018 A1* | 3/2005 | Whittle et al. | 709/223 |
| 2005/0066280 A1* | 3/2005 | Austin et al. | 715/733 |
| 2005/0091314 A1* | 4/2005 | Blagsvedt et al. | 709/204 |
| 2005/0091674 A1 | 4/2005 | Knight et al. | |
| 2005/0097458 A1 | 5/2005 | Wilson | |
| 2005/0182645 A1* | 8/2005 | Ehlis et al. | 705/1 |
| 2005/0188313 A1* | 8/2005 | Matthews et al. | 715/741 |
| 2005/0188314 A1* | 8/2005 | Matthews et al. | 715/741 |
| 2005/0188317 A1* | 8/2005 | Matthews et al. | 715/744 |
| 2005/0198584 A1* | 9/2005 | Matthews et al. | 715/779 |
| 2005/0227216 A1 | 10/2005 | Gupta | |
| 2005/0235224 A1* | 10/2005 | Arend et al. | 715/792 |
| 2005/0235251 A1* | 10/2005 | Arend et al. | 717/104 |
| 2005/0289559 A1 | 12/2005 | Illowsky et al. | |
| 2006/0004703 A1* | 1/2006 | Spivack et al. | 707/2 |
| 2007/0044086 A1* | 2/2007 | Sampath | 717/168 |
| 2007/0156522 A1* | 7/2007 | Carpenter et al. | 705/14 |
| 2007/0198946 A1* | 8/2007 | Viji et al. | 715/779 |
| 2009/0083638 A1* | 3/2009 | Gupta | 715/752 |

OTHER PUBLICATIONS

International Search Report (PCT/US07/060010) dated Feb. 25, 2008.

Google Desktop Features, Sidebar, pp. 1-19; copyright 2005 http://desktop.google.com/features.html—Date accessed: Jan. 4, 2006.

SBC Yahoo! Tutorials, Hand numbered pp. 1-83; Copyright 2005, Date accessed Jan. 4, 2006.

Supplementary European Search Report (EP 07 70 9909) dated Apr. 20, 2010.

* cited by examiner

COMMUNITY INFORMATION UPDATES IN A SIDEBAR

CROSS-REFERENCE TO RELATED APPLICATIONS

This continuation-in-part application claims the benefit of application Ser. No. 11/326,137, filed Jan. 4, 2006, entitled NETWORK USER DATABASE FOR A SIDEBAR, which is hereby incorporated herein by reference.

FIELD OF THE INVENTION

This disclosure is directed to computers and computer applications and, more particularly, to methods and systems for providing email services through a software tool that acts as an application aggregator for access to existing applications and that also adds additional features and functions, which in one embodiment, can be presented as a sidebar, the sidebar comprises a plurality of applications, such as, for example, Internet services and other computer applications.

BACKGROUND OF THE INVENTION

Many Internet content providers, such as, for example, Yahoo!, Inc. of Sunnyvale, Calif., offer a large number of Internet services, such as, for example, searching, email, news, photo sharing, maps, finance, weather, calendars, address books, instant messaging and a plurality of other services. In order to offer these services to a user in a centralized manner, Internet content providers have created software programs that act as application aggregators that can be displayed on a user's desktop or as part of a browser. Such applications have come to be called sidebars because in many instances the user interface is displayed on one side of user's display Examples are the Google Sidebar, an application supplied by Google Inc. of Mountain View, Calif. and the Yahoo! Sidebar supplied by Yahoo!, Inc. of Sunnyvale, Calif. The sidebar typically comprises a plurality of visibly distinct regions or modules, typically grouped in a vertical stack, each module comprising or representing a different application or function. The applications are identified by a titlebar, the titlebar further comprising controls for initiating additional functionality, such as, for example, initiating a slidesheet, or calling a menu. A slidesheet is a window that appears to slide out of the sidebar and can comprise additional information related to the selected application or function.

In addition to offering services some Internet content providers also allow users to create Internet accounts with the content provider. The user account allows the content provider to maintain a user database (UDB) for the user. The UDB comprises personal information, application preferences and other application information that can be accessed and shared by the content provider's various services. Present sidebars do not fully utilize the potential of the UDB, however.

Sidebars are helpful to both an Internet user and an Internet content provider. The Internet user can use the sidebar to quickly and easily access their web services and the Internet content provider can use the sidebar to introduce users to new services and various types of new media.

Accordingly, there is a desire for novel implementations of the sidebar, which improve usability and customizability.

SUMMARY OF THE INVENTION

The invention as described and claimed herein satisfies this and other needs, which will be apparent from the teachings herein.

The Internet allows people to connect and share thoughts in a number of different ways. For example, social networking communities allow users to add friends to their network, and thereby connected to many other people through their friends' friends. Social networking websites allow their users to post blogs, photos, blasts, and other media that a user wants to share with their group of friends, such as Yahoo! 360, offered by Yahoo! Inc. of Sunnyvale, Calif. Another example of a community network is an online photo sharing website. Photos are assigned tags and posted to a user's photo site. Other users can search for photos by user, group or tag. They can also comment on the photo. Yet another example of a community network is a review network. People know their friends tastes, so they can trust a friend's review more than another person's review. Many of these community networks provide email updates when a user's friend makes a new post. Vitality is an application module that, in one embodiment, seeks out updates to a user's community networks and lists them in a sidebar. Thus, the user can stay current with all their community networks without having to visit a number of different websites.

In one embodiment, a vitality module of a sidebar can work with a user's email alerts. For example, the vitality module can initiate a search for updated information in all of a user's community networks when an alert email is received from any one of the user's community networks. In one embodiment, the vitality module periodically polls the user's community networks for updated information. In one embodiment, the vitality module can receive an alert indicating that a user's community network has been updated. The alert can come from a general alert server, which manages all updates to a user's Internet services, and/or the alert can come from an alert application module in another application. The alert is not limited to an email, in one embodiment the alert can be a message from an alert server and/or from another application. In one embodiment, the alert also comprises the updated information.

In one embodiment, the vitality module only displays community information and only receives alerts from services offered by the same company that offers the sidebar, in order to promote the sidebar provider's services. In other embodiments, the sidebar can retrieve information and receive alerts from the sidebar provider's community sites and/or other content provider community sites by scraping, or by using the user's login and password for the specific site to collect updated information on behalf of the user. In one embodiment, emails received from third party community sites can be interpreted by the sidebar, and added to the vitality module. If the email comprises a URL that points to the updated information, the URL can be used by the sidebar to retrieve and display the updated information as part of a vitality slidesheet.

In one embodiment, email functions, such as, for example, reply, reply to all, forward, delete, mark as unread, and mark as spam can be accessed by a user through the sidebar. In one embodiment, the email retrieval protocol used by the sidebar is augmented to carry a second email identifier used by another email system. Thus, the sidebar can receive the second email identifier through the email retrieval protocol. Once the sidebar has the second email identifier, it can interact with systems that use the second email identifier, such as, for example, a spam control system.

Some application modules comprise a list of items, while other application modules do not display items. For example, an email application module comprises items while a photo slideshow that resizes images based on the size of the application module display area, does not. In known sidebars, the number of items in an application module display area is not discrete. For example, in an email application module the last email item in the list can be truncated or only partially displayed. In one embodiment, application modules that comprise items are forced to comprise a whole number of menu items. Thus, when a user resizes an application module, the application module will "snap" to fully include or fully exclude an item as opposed to displaying a partial item. A whole item display format can also be implemented in an application module's slidesheet.

In one embodiment, a browser independent sidebar, associated with a content provider, comprises an application module, displayed in the sidebar, through which a user can access functions associated with the application module, the application module being selected from a plurality of possible application modules, wherein the sidebar displays the application module based on sidebar application information; and computer code, the computer code being operable to execute an operation that retrieves the sidebar application information from a location a network.

In one embodiment, the sidebar application information is part of user specific information maintained by the content provider, the user specific information comprising additional information related to the user.

In one embodiment, the sidebar application information comprises instructions to display an application module in the sidebar, the displayed application module being selected by the content provider based on user specific information.

In one embodiment, the user specific information comprises information related to the user's usage of other content provider services.

In one embodiment, the user specific information comprises user preference information.

In one embodiment, the sidebar application information comprises instructions to display an application module in the sidebar, the displayed application module being selected by the content provider based upon content provider's preferences.

In one embodiment, the sidebar application information comprises an application module functionality, an application module display state and dimensional information that defines a dimension of the application module.

In one embodiment, the sidebar application information further comprises a desktop position.

In one embodiment, the computer code is further operable to execute an operation that retrieves application module preference information.

In one embodiment, the sidebar application information is retrieved at the same time as the application module preference information.

In one embodiment, the application module comprises module computer code the module computer code being operable to execute an operation that retrieves application module preference information.

In one embodiment, the sidebar further comprises a second application module, the application modules being positioned in a vertical stack.

In one embodiment, a functionality of the application module is an Internet address book. In one embodiment, a functionality of the application module is an instant messaging service. In one embodiment, a functionality of the application module is an email service. In one embodiment, a functionality of the application module is a photo service.

In one embodiment, the sidebar further comprises additional computer code, the additional computer code being operable to retrieve application module information associated with a function of the application module.

In one embodiment, the retrieved application module information is shared user information.

In one embodiment, the application module information is retrieved from the same location as the sidebar application information.

In one embodiment, the application module further comprises a slidesheet associated with the application module, said slidesheet comprising further application module functionality.

In one embodiment, a slidesheet further comprises a field through which the sidebar can accept edits to a user's user specific information.

In one embodiment, the sidebar further comprises edit computer code, the edit computer code being operable to execute an operation to transmit edited application module information to the content provider.

In one embodiment, the sidebar further comprises update computer code, the update computer code being operable to periodically execute an operation which requests updated application module information for an application module.

In one embodiment, the update computer code is further executable to periodically poll the content provider for updated application module information.

In one embodiment, the sidebar further comprises alert computer code, the alert computer code being operable to execute an operation to receive an alert when application module information is updated through another program.

In one embodiment, the computer code is further executable to retrieve the updated application module information in response to receiving an alert.

In one embodiment, the alert comprises the updated application module information.

In one embodiment, the application module comprises a whole number of items.

In one embodiment, the dimensional information is associated with the number of whole items in the application module.

In one embodiment, the user specific information is associated with the user's network user name and password.

In one embodiment, the sidebar further comprises caching computer code, the caching computer code being operable to execute an operation for caching the sidebar application information.

In one embodiment, a browser independent sidebar obtainable from a content provider, comprises an application module displayed in the sidebar through which a user can access functions associated with the application module, the application module being selected from a plurality of possible application modules, the sidebar displaying the application module based upon information, the information comprising user specific information; and computer code, the computer code being operable to execute an operation that retrieves said user specific information from a content provider location on a network.

In one embodiment, the user specific information comprises sidebar application information.

In one embodiment, the user specific information further comprises application module preference information.

In one embodiment, the user specific information further comprises user preference information.

In one embodiment, the user specific information further comprises shared user information.

In one embodiment, a sidebar, obtainable from a content provider offering other plural services to a user, comprises a module displayed in the sidebar, the module being selected from a plurality of possible modules, the sidebar displaying the module based in part on sidebar application information and user specific preference information maintained by said content provider in connection with said user and related to said user's interactions with one or more of said other plural services of said content provider; and computer code, the computer code being operable to execute an operation that retrieves said sidebar application information and said user specific preference information from a content provider location on a network.

In one embodiment, the user specific preference information is obtained by the content provider from the user based upon explicit preference indications made by the user during interactions with one or more of the other plural services.

In one embodiment, the explicit preference indication is a music preference indication made during interaction with a music service of the content provider.

In one embodiment, the explicit preference indication is a product preference indication made during interaction with a shopping service of the content provider.

In one embodiment, the explicit preference indication is based upon a recently used search term entered by said user during interaction with a search service of the content provider.

In one embodiment, the user specific preference information is obtained by the content provider based upon implicit preference indications derived utilizing data collected by the content provider related to the user's activities during interactions with one or more of the other plural services.

In one embodiment, the module displayed is selected by said content provider based upon information comprising the user specific preference information.

In one embodiment, the user specific preference information further comprises information related to said user's interactions with said sidebar.

In one embodiment, the selected module comprises an advertisement.

In one embodiment, the module comprises module functions available to the user, and wherein the functions are made available to the user based in part upon the user specific preference information.

In one embodiment, a method of populating a browser independent sidebar associated with a content provider comprises, requesting sidebar application information from a location a network, the sidebar application information comprising information used to build a graphical user interface for the browser independent sidebar, wherein the sidebar application information informs the sidebar to display an application module, through which a user can access functions associated with the application module, the application module being selected from a plurality of possible application modules; receiving the sidebar application information; and using the sidebar application information to build a graphical user interface for the sidebar.

In one embodiment, the content provider selects the application module to display in the sidebar based on information, the information comprising user specific information.

In one embodiment, the user specific information comprises sidebar application information.

In one embodiment, the user specific information further comprises application module preference information.

In one embodiment, the user specific information further comprises user preference information.

In one embodiment, the user specific information further comprises shared user information.

In one embodiment, the populating method further comprises requesting application module information for the application module of the sidebar; receiving the application module information; and loading the application module information into the application module.

In one embodiment, the populating method further comprises requesting updated application module information for an application module.

In one embodiment, the populating method further comprises receiving an alert of updated application module information from another source.

In one embodiment, the populating method further comprises obtaining a user name and a password associated with a user.

In one embodiment, the populating method further comprises caching the received sidebar application information.

In one embodiment, the populating method further comprises receiving edited user specific information from a user; and transmitting the edited user specific information to the content provider.

In one embodiment, a system for providing a browser independent sidebar compares a user computer communication application, coupled to a network, the communication application being operable to request sidebar application information, the sidebar application information comprising information used to build a graphical user interface for the browser independent sidebar, wherein the sidebar application information informs the sidebar to display an application module, through which a user can access functions associated with the application module, the application module being selected from a plurality of possible application modules; and a user database server, coupled to the network, the user database server having stored thereon user specific information as part of a user database, wherein the user specific information compares the sidebar application information.

In one embodiment, the system further comprises an application module server from which the user computer can request application module information.

In one embodiment, the sidebar application information is created by the content provider based on information, the information comprising user specific information.

In one embodiment, the user database server is maintained by the sidebar provider.

In one embodiment, a sidebar displays targeted advertising in a sidebar and in the slidesheets of a sidebar. The advertisements can be targeted to the user based on user specific information and/or other information about the user.

In one embodiment, the targeted advertisement is related to a term most searched by the user. The user's search statistics can be gathered through the sidebar, a browser, or other search applications. In one embodiment the advertisement can be associated with a retailer website that the user frequently visits. In one embodiment, the advertisement can be for accessories for a product recently purchased by the user. In one embodiment, the advertisement can be associated with interests that the user previously selected in a profile built by the user, or through explicit preference selections made by a user during interaction with other services, for example, music or shopping services, or derived by the service provider through observed behavior of the user as the user interacts with the provider's services or other Internet or user computer activities. Thus, for example, by utilizing user preference information obtained through a user's interactions with a music service of the content provider, the content provider can offer personalized advertisements. For example, if a user has indicated a preference for metal music, this information can be used to generate an ad that features a new metal CD, concert, or other metal products. Similarly, shopping preferences can be obtained through product ratings or preferences indicated by a user interacting with a shopping service of the content provider. In one embodiment, the sidebar can perform a keyword search on documents, currently open on the computer, currently being viewed by the user, and/or frequently or recently accessed by the user, and display advertisements associated with any matched keywords.

In addition to targeted advertisements in the main sidebar, targeted advertisements can also be included in the sidebar's slidesheets. The slidesheet advertisements can be associated with the type of application module that it is displayed in. In addition, if a user is signed into the sidebar, the slidesheet advertisement can be associated with the application module type selected, so that, for example, when the user selects the photo related application module in the sidebar, the targeted ad can be photo related, such as, for example, a camera ad or an ad for a photo editing program.

The Internet allows people to connect and share thoughts in a number of different ways. For example, social networking communities allow users to add friends to their network, and thereby connected to many other people through their friends' friends. Social networking websites allow their users to post blogs, photos, blasts, and other media that a user wants to share with their group of friends, such as Yahoo! 360, offered by Yahoo! Inc. of Sunnyvale, Calif. Another example of a community network is an online photo sharing website. Photos are assigned tags and posted to a user's photo site. Other users can search for photos by user, group or tag. They can also comment on the photo. Yet another example of a community network is a review network. People know their friends tastes, so they can trust a friend's review more than another person's review. Many of these community networks provide email updates when a user's friend makes a new post. Vitality is an application module that, in one embodiment, seeks out updates to a user's community networks and lists them in a sidebar. Thus, the user can stay current with all their community networks without having to visit a number of different websites.

In one embodiment, a vitality module of a sidebar can work with a user's email alerts. For example, the vitality module can initiate a search for updated information in all of a user's community networks when an alert email is received from any one of the user's community networks. In one embodiment, the vitality module periodically polls the user's community networks for updated information. In one embodiment, the vitality module can receive an alert indicating that a user's community network has been updated. The alert can come from a general alert server, which manages all updates to a user's Internet services, and/or the alert can come from an alert application module in another application. The alert is not limited to an email, in one embodiment the alert can be a message from an alert server and/or from another application. In one embodiment, the alert also comprises the updated information.

In one embodiment, the vitality module only displays community information and only receives alerts from services offered by the same company that offers the sidebar, in order to promote the sidebar provider's services. In other embodiments, the sidebar can retrieve information and receive alerts from the sidebar provider's community sites and/or other content provider community sites by scraping, or by using the user's login and password for the specific side to collect updated information on behalf of the user. In one embodiment, emails received from third party community sites can be interpreted by the sidebar, and added to the vitality module. If the email comprises a URL that points to the updated information, the URL can be used by the sidebar to retrieve and display the updated information as part of a vitality slidesheet.

Other objects and features of the invention will become apparent from the following detailed description, considering in conjunction with the accompanying drawing figures. It is understood however, that the drawings are designed solely for the purpose of illustration and not as a definition of the limits of the invention.

BRIEF DESCRIPTION OF THE DRAWING FIGURES

The drawing figures are not to scale, are merely illustrative, and like reference depict like elements throughout the several views.

DETAILED DESCRIPTION OF EXEMPLARY EMBODIMENTS

There will now be shown and described in connection with the attached drawing figures several embodiments of a sidebar and methods for providing the same.

The term Internet as used herein, unless otherwise specified expressly or by context, is intended to have a broad non-limiting definition, and refers, without limitation, to a global computer network and/or any other group or subgroup of computers or other computing devices communicatively coupled together.

The term sidebar as used herein unless otherwise specified expressly or by context, is intended to have a broad non-limiting definition, and refers, without limitation, to a software program that can be displayed to a user in a plurality of different states, and appears as, for example, a vertical stack, as a floating toolbar, a deskbar, a system tray icon and other forms, and that serves as a browser-independent resource through which a user can interact with sidebar specific applications and/or other application programs accessible on the user's computing device and/or the Internet, the sidebar offering features and functions complimentary to, the same as, or in addition to those found in the other application programs.

Figure 1:
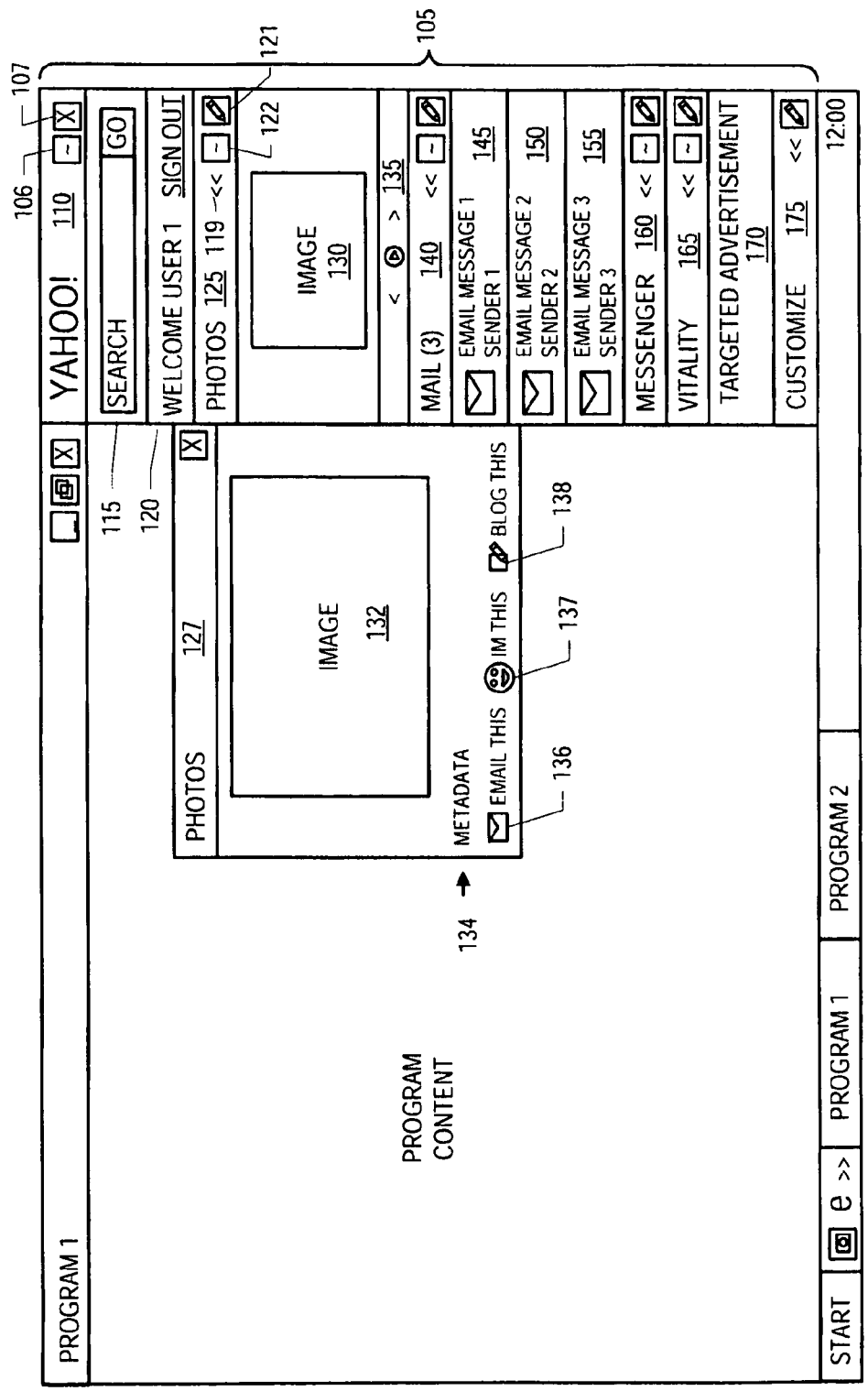
FIG. 1 illustrates a desktop comprising a sidebar implemented according to one embodiment of the invention.

FIG. 1 illustrates a sidebar 105, implemented according to one embodiment of the invention. The sidebar 105 comprises a titlebar 110 and a plurality of application modules 115, 120, 125, 140, 160, 165, 170, 175 displayed in a vertical stack. An application module, as used herein, is a software application module, component or portion thereof, that implements a described feature or function of the sidebar. The application modules load with application specific information and each application module can preferably automatically update in a manner known in the art. In one embodiment, the sidebar 105 can also automatically receive updates. The sidebar 105 is a stand alone application that is not tied to a browser. The titlebar 110 comprises a title for the sidebar, a control 106 to minimize the sidebar 105, and a control 107 to close the sidebar.

Below the titlebar 110 is a search application module 115. A user can use the search application module 115 to perform searches on the Internet and/or on the user's computer. In one embodiment (not shown), when the user starts to type in the search field, a slidesheet, which is an extended user interface portion that appears to slide out from one vertical side of the sidebar, appears comprising search results. In one embodiment, computer searches will automatically update with each new letter added to the search field, and a web search is presented when the user selects the "go" button. In one embodiment, the search application module 115 is a permanent module of the sidebar, which cannot be removed by a user. In one embodiment, more specific searches, such as, for example, shopping, images, video and other topics can also be initiated through the slidesheet.

Sidebar 105 preferably also comprises a welcome module 120 or other sign-in area under the search module 115. Some Internet content providers maintain a user database (UDB) that comprises a user's personal information, application settings, and other information. User information stored in a UDB can generally be accessed by and preferably be used to personalize some or all of that Internet content provider's services. In addition, the UDB can store a user's sidebar preferences. In one embodiment, a sidebar 105 uses a username and password to access a user's sidebar preferences from a UDB. In one embodiment, a copy of the user's sidebar preferences is stored on the user's computer, and can be retrieved from the computer, for example, in "off-line" situations, where an Internet connection is not available. In one embodiment, a user's sidebar preferences comprise the types of application modules that appear in the sidebar 105, display states for the application modules and dimensional information for a display area of an application module. For example, a user preference can inform a sidebar 105 to add an email module in an open state, with a length of 100 pixels, an IM module in an open state, with a length of 500 pixels and a vitality module in a closed state.

In one embodiment, the sidebar 105 can obtain a username and password from a cache on the user's computer, which was saved, for example, on the computer when the user last signed into an Internet content provider's website or another application provided by the content provider. Thus, the user is provided with a Single Sign On (SSO) option. In one embodiment, for some application modules that require additional protection, the user is asked to reenter their password. In one embodiment, if a username and password are not readily available to the sidebar 105 (user not signed in), the sidebar 105 can request a username and password from the user.

In one embodiment, when a user first installs a sidebar 105 on their computer, a content provider chooses which application modules will populate the sidebar 105. The content provider can choose the application modules based on user information in the UDB, and/or which content provider services a user uses. For example, if the user favors a particular service and/or if a user neglects a particular service, it can be added to the sidebar 105 for the user's convenience. In one embodiment, the content provider can measure the usage of a particular service by the amount of information stored in a UDB for that service. In addition, the content provider can load the sidebar 105 with services that they want to promote. If the user is an avid user of Instant Messenger, with a large number of friends in their friend list, the content provider can default an IM module in the sidebar. If the user is a part of a social networking service, and has a large network of friends, the content provider can add a vitality module to the sidebar 105, so that the user can stay current with any updates made by friends in their community.

When a user is signed in, the welcome module 120 comprises a "sign out" link, which the user can select to sign out of the sidebar 105. In one embodiment, when no one is signed into the sidebar 105, an anonymous user is applied and the sidebar 105 is preferably loaded with a default set of information. The anonymous sidebar 105 can display images taken from the user's computer or from a random Internet photo sharing site. In addition, other application modules such as mail, instant messenger and vitality (discussed below) can give the user a preview of what the application module can provide for the user. Furthermore, in one embodiment, advertisements displayed in an anonymous sidebar 105 are selected at random.

Figure 2:
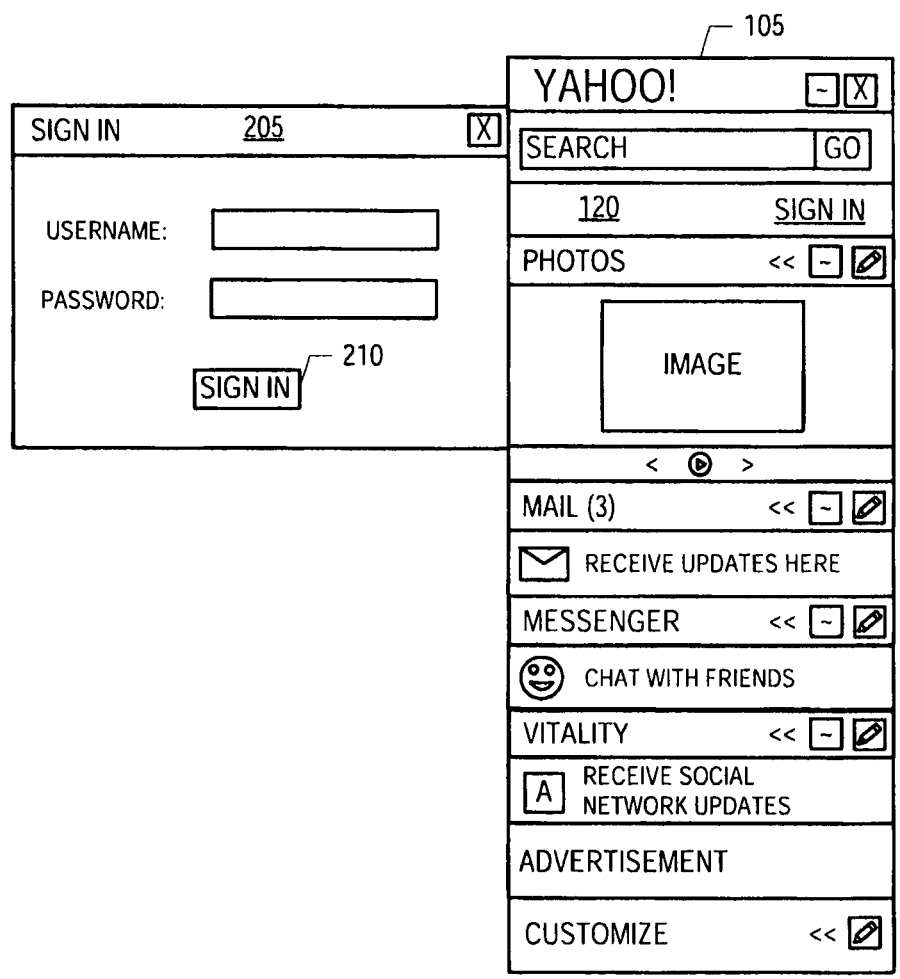
FIG. 2 illustrates a sign in slidesheet implemented according to one embodiment of the invention.

FIG. 2 illustrates an exemplary sidebar 105 as would be experienced by an anonymous user. While an anonymous user is loaded in the sidebar 105, the sidebar 105 comprises a "sign in" link, which the user can select to sign into the sidebar 105. In one embodiment, when the user selects the "sign in" link a "sign in" slidesheet 205 appears from the left side of the sidebar 105. The slidesheet 205 comprises a field for a username and a field for a user password.

After inputting a user name and password, the user can select the "sign in" button 210 to sign in to the sidebar 105. The sidebar 105 sends the received information to an Internet content provider who verifies the user name and password. In response to a positive match between the username and password, the Internet content provider sends the user's sidebar 105 preferences, which are stored on the content provider's database, to the user. The sidebar 105 then uses the user preference information to build a customized or personalized graphical user interface (GUI), which is tailored to the user in accordance with the user's preference or other data as found, for example, in the content provider's UDB. As mentioned above, the user's UDB information and the user's activities can be used to predict which application modules are important to the user. If the sidebar comprises application modules that are important to a user it will compel the user to continue to use the sidebar.

Since the user's preferences are stored with the Internet content provider on the Internet, the user's personalized sidebar 105 experience is available to them not just on their personal computer but on any computer with an Internet connection.

Returning to FIG. 1, below the welcome module 120, in the depicted embodiment the sidebar 105 comprises a photo module 125. The titlebar of photos module 125 comprises a doubled arrow button 119, which a user can select to initiate a slidesheet with further information regarding their photos. For example, in one embodiment, clicking the double arrow button initiates a slidesheet comprising the image 130 currently displayed in the sidebar 105, one or more images that were previously displayed and one or more images that will be displayed.

The titlebar also comprises a minimize button 122 and an edit button 121. In one embodiment, when the user selects the edit button 121, a menu is generated (not shown). The menu can comprise options, which the user can select to edit the application module. For example, in a photo module 125, a menu can comprise an option to add new photos to a slideshow.

By further example in FIG. 1, in the depicted embodiment below the photos application module 125 titlebar, is an application module display area. The application module display area is where the application module displays its information to a user. The photos application module 125 comprises an image 130. In one embodiment, the image 130 can be retrieved from the user's computer or the photos application module 125 can display images taken from the Internet. Also included in the application display area, below the image 130, is a control bar 135, which a user can use to control their slideshow. In one embodiment, the control bar 135 comprises one button to skip to the next photo, one button to rewind to a previous photo and one button to pause/play the slideshow.

In one embodiment, for example when a user clicks on the image 130, a photos slidesheet 127 appears from the left side of the sidebar 105. The photo slidesheet 127 comprises a larger version 132 of the image 130 displayed in the slidesheet 105. In one embodiment, the photo slidesheet 127 also comprises metadata 134 associated with the image 132. The metadata 134 can include, in one embodiment, the location of the photo. In one embodiment, the photo is located on the user's computer and the location is a local directory. In one embodiment, the photo is taken from an Internet photo sharing site and the location is a universal resource identifier (URI). In one embodiment, the metadata can also comprise tags associated with photos from a photo sharing site. The tags are used to categorize photos and find new photos with similar tags.

Below the metadata 134, the photo slidesheet 127 also comprises sharing buttons 136, 137, 138. In one embodiment, the sharing buttons comprise an "email this" button 136, an "IM this" button 137 and a "blog this" button 138. The user can use these buttons to share the photo 132 with other Internet users. The sharing buttons are not limited to these sharing options. Other sharing options, such as, for example, blasting on a social networking website, can also be added to the slidesheet 127. In addition, sharing buttons are not limited to the photos module 125. Any media, for example, images, articles, videos, reviews and other sharable media, which is display by the sidebar 105, can include sharing buttons to provide the user with a quick and convenient tool for sharing content with their friends.

Returning to the main sidebar 105, (FIG. 1), below the photos module 125 is an email module 140. The email module 140 comprises a titlebar with controls and a display area comprising unread emails from a user's inbox. The email module interacts with a user's email program(s) such as Outlook, Yahoo! Mail, and the like, to provide a compact interface and access to certain functions of the main email program. The email module 140 is in a preferred open state, and thus comprises a subset of a full set of application module information. The different display states of an application module are discussed below. The criteria for the subset of information can be chosen by the user, and in FIG. 1, the example subset depicted is unread emails. In one embodiment, unread emails in a user's "bulk" folder are ignored when the unread emails are populated in the email module 140. Thus, the user is protected from receiving spam in their sidebar 105. In one embodiment, the subset of emails can be limited to family members. Application module display states are discussed further below.

As seen in the example depicted in FIG. 1, the email module 140 comprises three messages 145, 150 and 155. In one embodiment, when a user selects one of the unread emails, a slidesheet appears for displaying more of, or all of, the text of the email. Email options, such as, for example, reply, forward and reply to all can also be provided to a user from a slidesheet. In one embodiment, when a user selects one of their unread emails, the email item disappears from the mail module 140 and the mail module 140 resizes. The email module 140 communicates with the email application on the user's machine or as administered by an email service made available by an Internet content provider so that changes made in the email module 140 are reflected in the user's principal email application. Thus, for example, an email forwarded via the sidebar mail module 140 will be indicated as forwarded should the user log on to their principal email application on-line.

In one embodiment, a sidebar 105 application module comprises a subset of all the services that are available through the full service counterpart of the application. In one embodiment, a user is redirected to the full service counterpart of an application, when a non-supported service is selected. Opening the full service counterpart of the application not only provides users with additional functionality, it can also be used by an Internet content provider to introduce users to new services and/or to new aspects of services that the user already uses. For example, in one embodiment, an email module only displays unread emails from a user's inbox. The user must use the full service email application to view read mail. In one embodiment, an email module can display the text of an email, but the user must use the full service email application to obtain an attachment to the email.

Returning to the example of FIG. 1, the sidebar 105 also comprises an instant messenger (IM) module 160. The IM module is in a closed state (described below). In one embodiment, a user can change the state of application modules by double clicking on the titlebar and/or selecting the double arrow button.

A vitality module 165 is displayed under the messenger module 160. Vitality allows users of community services such as reviews, blogs or social networking sites to remain current with updates made to these community services. Vitality will be discussed below.

Below the vitality module 165 is a targeted advertisement 170. The targeted advertisement 170 is selected based on one or more criteria associated with the user. For example, in one embodiment, the targeted advertisement can be selected based on information in a user's UDB and/or on recent user actions, such as, for example, recent searches and/or purchases.

Below the targeted advertisement 170 is a "customize" module 175. In one embodiment, the user can select the "customize" module 175 to make changes to their sidebar 105. For example, the user can add application modules and perform other preference setting functions.

Figure 3:
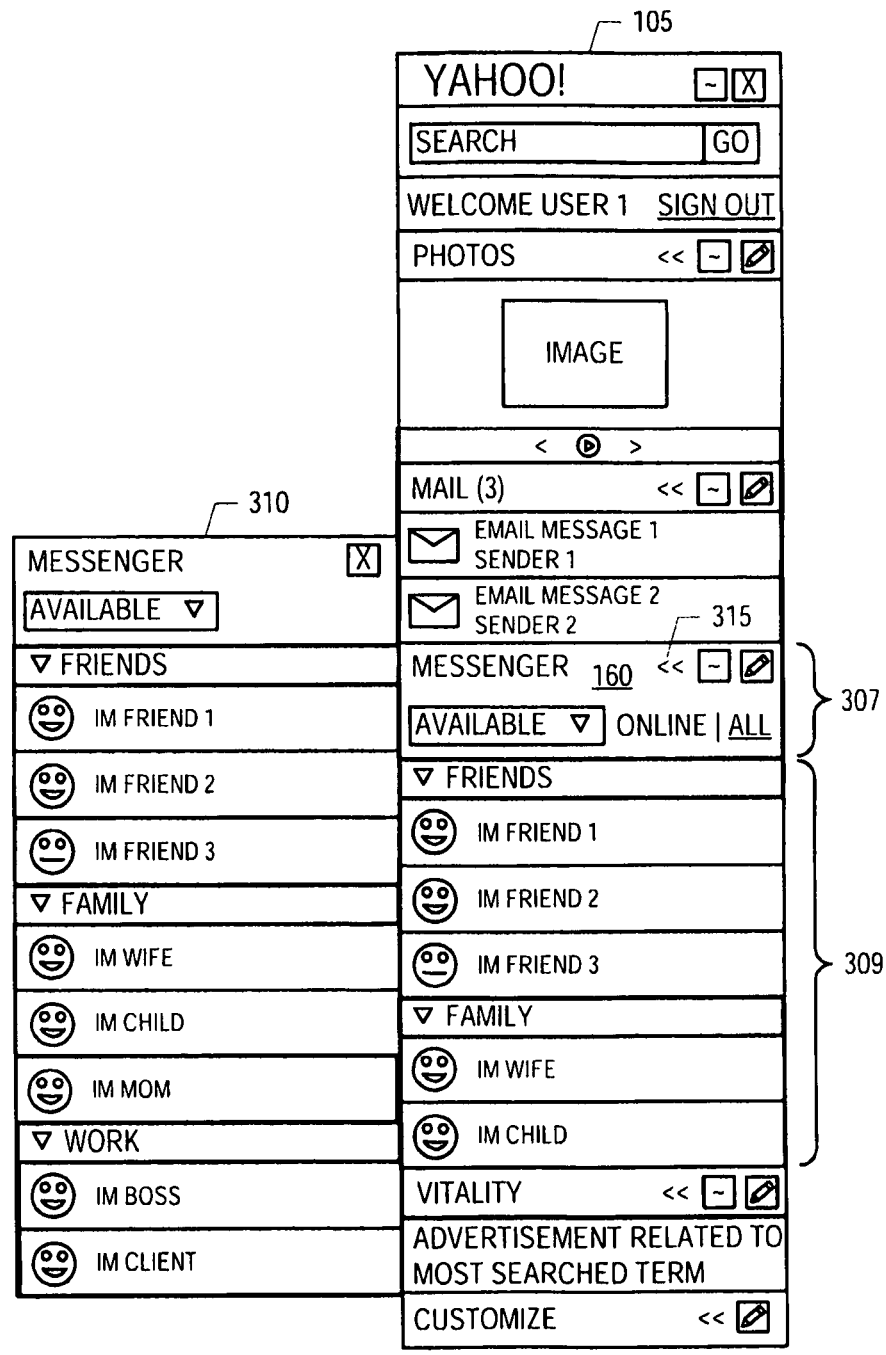
FIG. 3 illustrates an instant message application module in a sidebar implemented according to one embodiment of the invention displaying a full open state.
Figure 4:
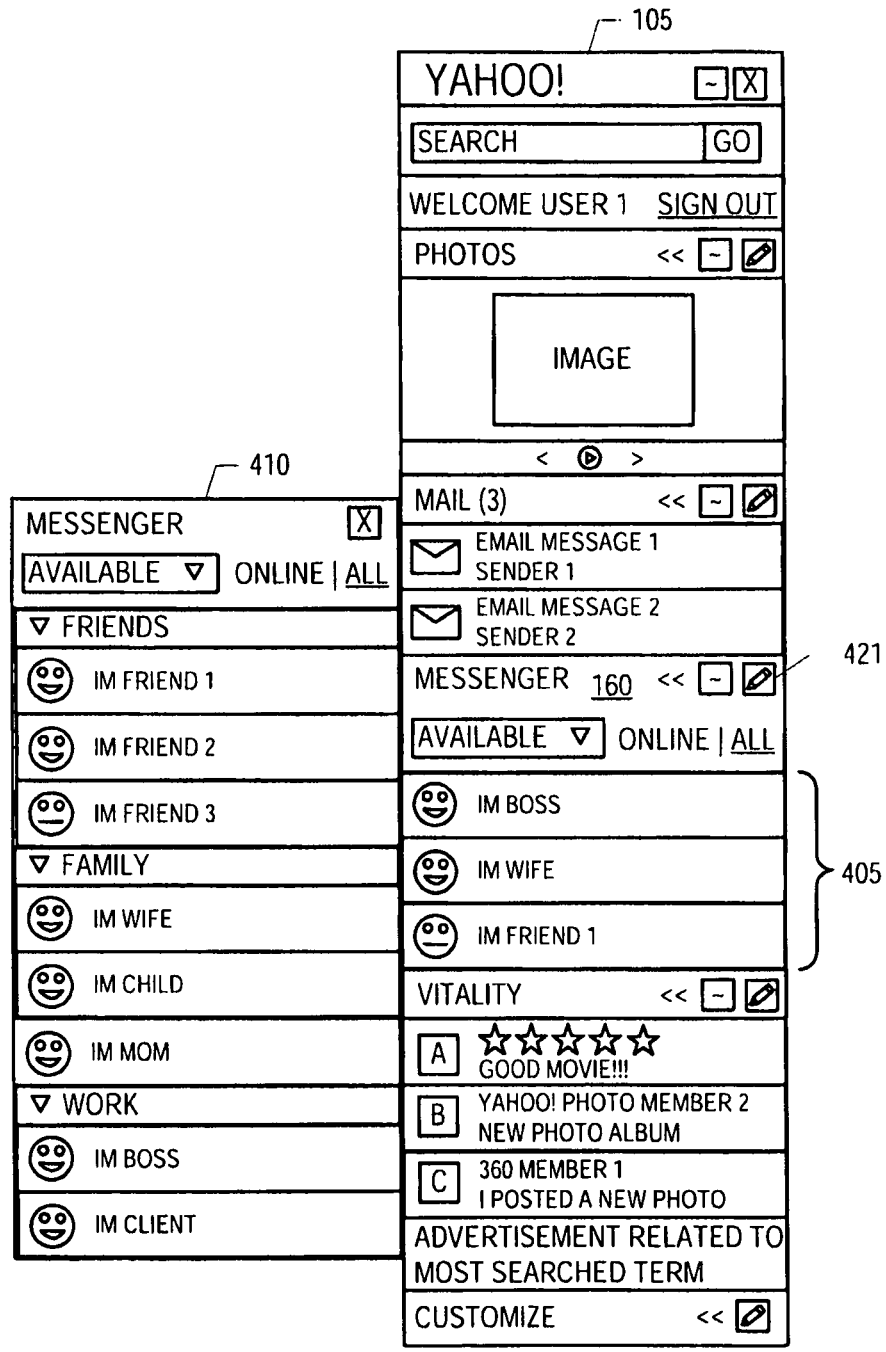
FIG. 4 illustrates an instant message application module in a sidebar implemented according to one embodiment of the invention displaying a preferred open state.
Figure 5:
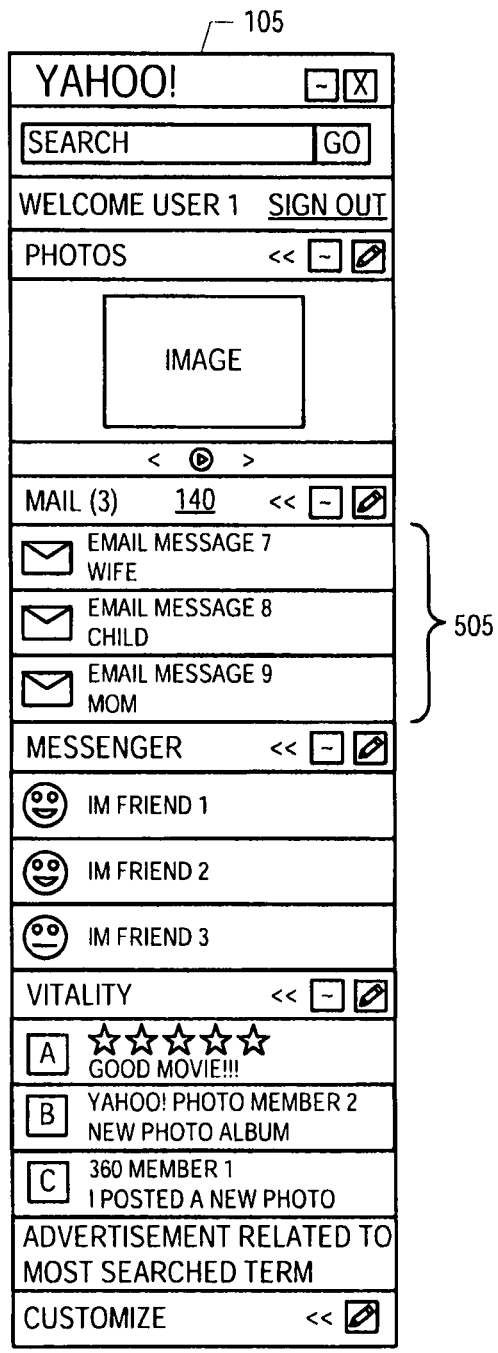
FIG. 5 illustrates an email application module in a sidebar implemented according to one embodiment of the invention displaying a preferred open state.

A sidebar 105 typically has a limited amount of room to display its application modules, and each application module can have a large number of items that a user may wish to access. Thus, it will be recognized from the teachings presented herein that the particular deployment of a sidebar of the present disclosure can be modified to suit application specific needs or user requirements and still be within the scope of the inventions described herein. Thus, in one embodiment, an application module may exist in one of a plurality of states. FIGS. 3-5 illustrate a plurality of application modules in various states. The sidebar 105 depicted in FIGS. 3-5 are longer in vertical length than the sidebar 105 in FIGS. 1-2, but the Figures represent the same sidebar 105 in different display states. In one embodiment, a user can increase the resolution of their display and thus provide more room for the sidebar to display additional information.

In a closed state, the application module displays a titlebar comprising a title identifying the application module. Application modules 160, 165 and 175 of FIG. 1 are in a closed state. In one embodiment, the closed state can also comprise a limited amount of information, such as, for example, one stock quote, or a temperature for one location. In one embodiment, as shown in FIG. 3, the IM module titlebar 307 can comprise a tool to display and adjust the current status of a user.

In a full open state, the application module displays as much of a full set of application module information that fits in or is designed for a display area 309. FIG. 3 illustrates an IM module 160 in a full open state. In the full open state, the IM module display area 309 can display the user's entire friends list. As the display area 309 is increased in size, more of the user's friends list is displayed to the user. The full friends list can also be viewed by selecting the slidesheet button 315, and initiating a slidesheet 310 comprising the friends list. In one embodiment, if a user's friends list extends beyond the vertical length of the slidesheet 310, a scroll bar is displayed on the right side of the slidesheet 310, so that the user can access all of their friends.

In a preferred open state, an application module display area comprises a subset of the application module information displayed in a full open state. A preferred open state allows the sidebar 105 to display a subset of information that is more important and/or useful to the user. The information included in the subset can be chosen by the user.

FIG. 4 illustrates an IM module 160 in a preferred open state. In one embodiment, in the preferred open state, the IM module display area 405 comprises the IM participants that the user most recently conversed with. In one embodiment, the IM module 160, updates the display area 405 with IM participants contacted through the sidebar 105 or through a stand alone messenger application. In one embodiment, both the messenger application and the sidebar 105 track a user's IM usage and stores the usage information in the user's UDB so that both applications have access to the user's most recent contacts. In one embodiment, when both applications are running, the applications can send messages to each other to keep updated. In one embodiment, one application can be allowed to track the operations of the other application so that the list can remain current. In one embodiment, as the user increases the size of the IM module 160, additional IM participants are added to the list.

In one embodiment, an IM module 160 preferred open state can comprise the IM participants in one of the user's groups. In one embodiment, an IM module 160 preferred open state can comprise the "most active" IM participants.

In one embodiment, a slidesheet displayed from a preferred open state comprises a full set of application module information. Thus, in FIG. 4, the slidesheet 410 comprises the entire friends list. In one embodiment, the slidesheet can comprise a more comprehensive subset of information and/or a plurality of different subsets of information. In one embodiment, the preferred open state is the only available open state for the sidebar. A full set of information can only be accessed through a slidesheet. In one embodiment, a user can switch between open states through a menu accessed from the menu button 421. In one embodiment, the titlebar of the application can comprise a button for switching between states.

The preferred open state is not limited an IM module 160. FIG. 5 illustrates an email module 140 in a preferred open state. In a full open state the IM module display area 505 can comprise all the email in a user's inbox (not shown). In a preferred open state, the display area 505 can comprise a subset of emails from the user's inbox. For example, in one embodiment, the display area 505 can be configured to comprise email only from the user's family. In one embodiment, the preferred open state can comprise only unread email.

Figure 6:
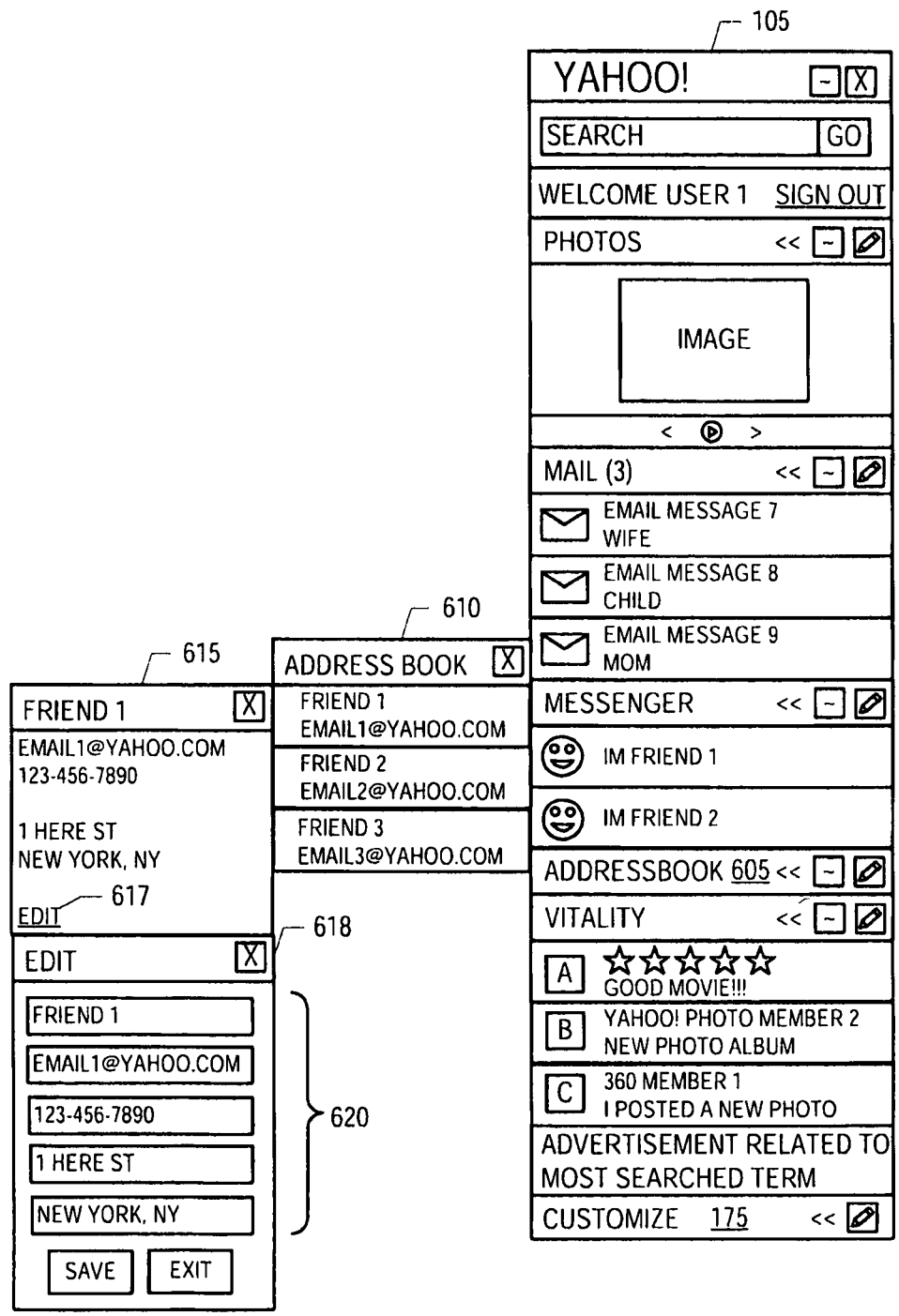
FIG. 6 illustrates an editable slidesheet implemented according to one embodiment of the invention.

The sidebar 105 can be used to access user information, such as, for example, an address book, a calendar, notes and other user information. FIG. 6 illustrates a sidebar 105 comprising an address book module 605. In one embodiment, the address book module 605 can be added to the sidebar 105 through the customize module 175. An Internet address book is a service provided by an Internet content provider which a user can use to save their contacts on a server. Saving contacts on a server allows the user to access their contacts from any computer that has access to the Internet. In one embodiment, the address book module 605, can also search the user's local computer for contact information.

In one embodiment, when a user selects the double arrow button in the titlebar of the address book module 605, an address book slidesheet 610 is displayed. The address book slidesheet 610 comprises a list of items comprising the user's contacts. In one embodiment, the items comprise the name of the contact, and the contact's email address, if available.

When a user selects one of the contacts in the slidesheet 610, an individual contact slidesheet 615 is initiated. The individual contact slidesheet 610 comprises some or all of the information available to a user through a full address book service. For example, in FIG. 6, the contact slidesheet 615 comprises the name of the contact in the titlebar an email, a physical address and a phone number. Other information can comprise an IM identifier, notes, mobile phone, birth date, and other contact information.

The contact slidesheet 615 also comprises a link 617 to edit the information. Selecting the edit link 617 initiates an edit slidesheet 618. The edit slidesheet 618 provides a number of fields 620 that a user can type in to edit the contact information. Once the user has finished editing, they can select the save button to save their edits or the exit button to cancel their edits. In one embodiment, the edit slidesheet 618 can appear to the left of the contact slidesheet 615. In one embodiment, the edit slidesheet 618 can replace the contact slidesheet 615. In one embodiment, selecting the edit button 617, initiates a full address book service, for example, through a browser.

Using the slidesheets of the sidebar 105, a user can access their contact information, and other personal user information, such as, for example, a schedule and notes, directly from a desktop without opening another application or having to access an address book webpage through a browser. In addition, the user can edit their personal information directly through the sidebar 105. The edits are transmitted to an Internet content provider and saved on a server so that changes made to the user's personal information, through the sidebar 105, are available to the user and to other applications. An address book is just one example of an Internet service that can be accessed and edited through the sidebar. In other embodiments, the sidebar can have an application module for personal notes, news, maps, weather, a calendar and other personal Internet services that store user information.

In one embodiment, the sidebar can comprise a combination address book and IM module (not shown). A full vertical slidesheet for this combination module can comprise a tabbing structure. An address book tab comprises a list of the user's contacts, and an IM tab comprises a user's friends list. In one embodiment, the user can message an IM participant from either list. In one embodiment, if any of the user's address book contacts is an IM participant, their "sign-in" status is visible from the address book tab. For example, in one embodiment, an item in the address book tab can comprise a smiling face for a signed-in participant and a sleeping face for a signed-off participant.

Since the sidebar 105 has access to a user's personal information the sidebar 105 can offer targeted advertisements to the user. A targeted advertisement is more likely to be read and clicked on by a user and is less intrusive to the user because it is relevant to their interests. The sidebar 105 of FIG. 7 comprises a targeted advertisement 705. In one embodiment, the targeted advertisement 705 is related to a term most searched by the user. Thus, if the user performs a number of searches for a particular car manufacturer, a fashion designer or an actor, the sidebar 105 can display advertisements that are associated with the user's search terms. The user's search statistics can be gathered through the sidebar 105, a browser, or other search applications.

In one embodiment the advertisement 705 can be associated with a retailer website that the user frequently visits. In one embodiment, the advertisement 705 can be for accessories for a product recently purchased by the user. In one embodiment, the advertisement can be associated with interests that the user previously selected in a profile built by the user, or through explicit preference selections made by a user during interaction with other services, for example, music or shopping services, or derived by the service provider through observed behavior of the user as the user interacts with the provider's services or other Internet or user computer activities. Thus, for example, by utilizing user preference information obtained through a user's interactions with a music service of the content provider, the content provider can offer personalized advertisements. For example, if a user has indicated a preference for metal music, this information can be used to generate an ad that features a new metal CD, concert, or other metal products. Similarly, shopping preferences can be obtained through product ratings or preferences indicated by a user interacting with a shopping service of the content provider. In one embodiment, the sidebar 105 can perform a keyword search on documents, currently open on the computer, currently being viewed by the user, and/or frequently or recently accessed by the user, and display advertisements associated with any matched keywords.

In addition to targeted advertisements in the main sidebar 105, targeted advertisements can also be included in the sidebar's 105 slidesheets. The slidesheet advertisements can be associated with the type of application module that it is displayed in. In addition, if a user is signed into the sidebar 105, the slidesheet advertisement can be associated with the application module type selected, so that, for example, when the user selects the photo related application module in the sidebar 105, the targeted ad can be photo related, such as, for example, a camera ad or an ad for a photo editing program.

For example, in one embodiment, when a user opens a slidesheet for a photo module 125, the photos slidesheet 710 comprises an advertisement 720 for a digital camera. In one embodiment, a weather module can display an advertisement for an umbrella if the weather is rainy, and advertisement for sunscreen if the weather is sunny and an advertisement for antifreeze if the weather is snowing. In one embodiment, a finance module can display an advertisement for an online brokerage house. These slidesheet advertisements 720 can be further targeted to the user by displaying a camera manufacturer that the user purchased in the past, or displaying new services from an online brokerage house that the user is a member of.

In one embodiment, selecting the advertisement 720 in the slidesheet 710 opens a new slidesheet 725 with additional information regarding the advertised product or service. In one embodiment, selecting the advertisement can open a browser window to the advertiser's homepage or to a retailer where the product can be purchased.

In one embodiment, the sidebar 105 can display an advertisement based on recent user interaction with the sidebar 105. For example, which application module was recently added to the sidebar 105, which application modules were recently placed in an open state, which application module is most frequently used by the user, and other sidebar 105 interactions.

Some application modules comprise a list of items, while other application modules do not display items. For example, an email application module comprises items while a photo slideshow that resizes images based on the size of the application module display area, does not. In known sidebars, the number of items in an application module display area is not discrete. For example, in an email application module the last email item in the list can be truncated or only partially displayed. In one embodiment, application modules that comprise items are forced to comprise a whole number of menu items. Thus, when a user resizes an application module, the application module will "snap" to fully include or fully exclude an item as opposed to displaying a partial item. A whole item display format can also be implemented in an application module's slidesheet.

Figure 7:
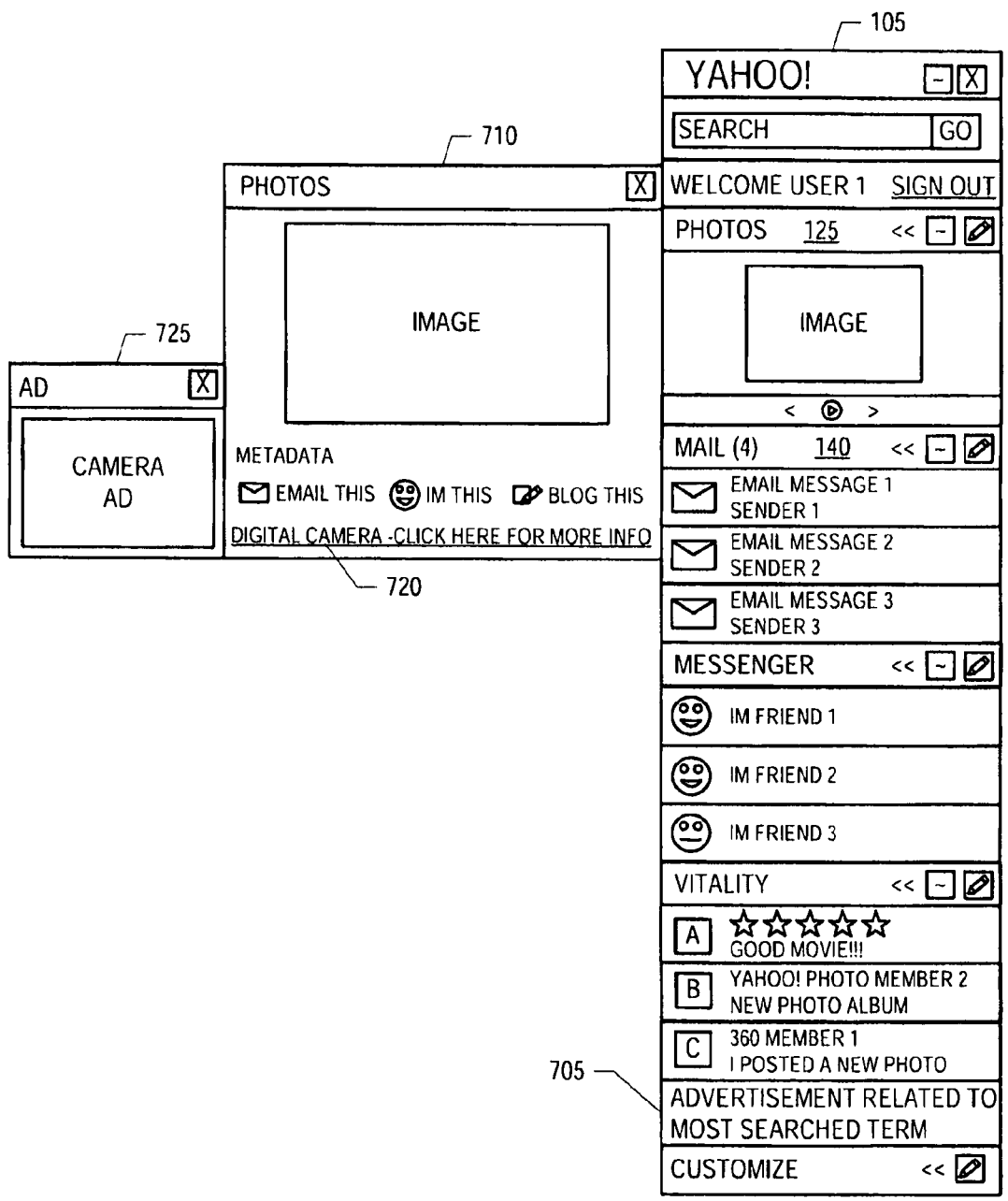
FIG. 7 illustrates a targeted advertisement in a sidebar and a targeted advertisement in a slidesheet implemented according to one embodiment of the invention.
Figure 8:
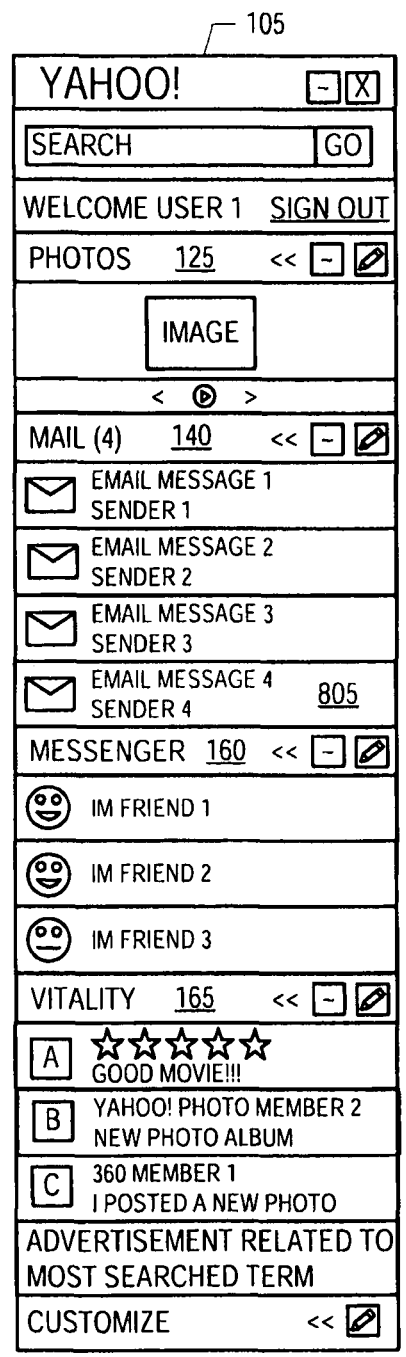
FIG. 8 illustrates application modules implemented according to one embodiment of the invention, the application modules comprising a whole number of items.

For example, and as discussed further below, the email module 140 of FIG. 7 comprises three email messages while the email application module 140 of FIG. 8 comprises a whole fourth message 805. The whole fourth message 805 would have appeared even if the user did not resize the application module to include the entire fourth message 805.

Since the space available to the sidebar is finite, if one application module increases in size another application module shrinks in size. In one embodiment, when a user increases an application module with items the additional space is taken from an application module that does not comprise the items, such as, for example, a photo module or a notepad module. As shown in FIG. 8, photo module 125 has shrunk to accommodate the additional email message 805.

If the photo module cannot be shrunk further, then whole items are deleted from application modules with items. If all of the open application modules can no longer be shrunk, in one embodiment, the sidebar can force application modules into a closed state and/or the user is not allowed to increase the size of the application module any further. In one embodiment, the sidebar 105 can memorize the state of the application modules that were affected by the resize so that if the user undoes the resize the affected application module can be returned to their original state.

If an application module is increased in size, in one embodiment, the sidebar 105 restores the other modules in a reverse order in which they were shrunk. In one embodiment, the sidebar 105 can insert grace space on the bottom of the sidebar 105, if necessary.

If an application module without items is resized, the sidebar first takes space from another application module without items. If the other all application modules without items can no longer be shrunk, the sidebar 105, in one embodiment, can delete whole items and snap the size of the resized application module to accommodate the available free space. In one embodiment, the sidebar 105 can insert grace space on the bottom of the sidebar 105, if necessary.

Figure 9:
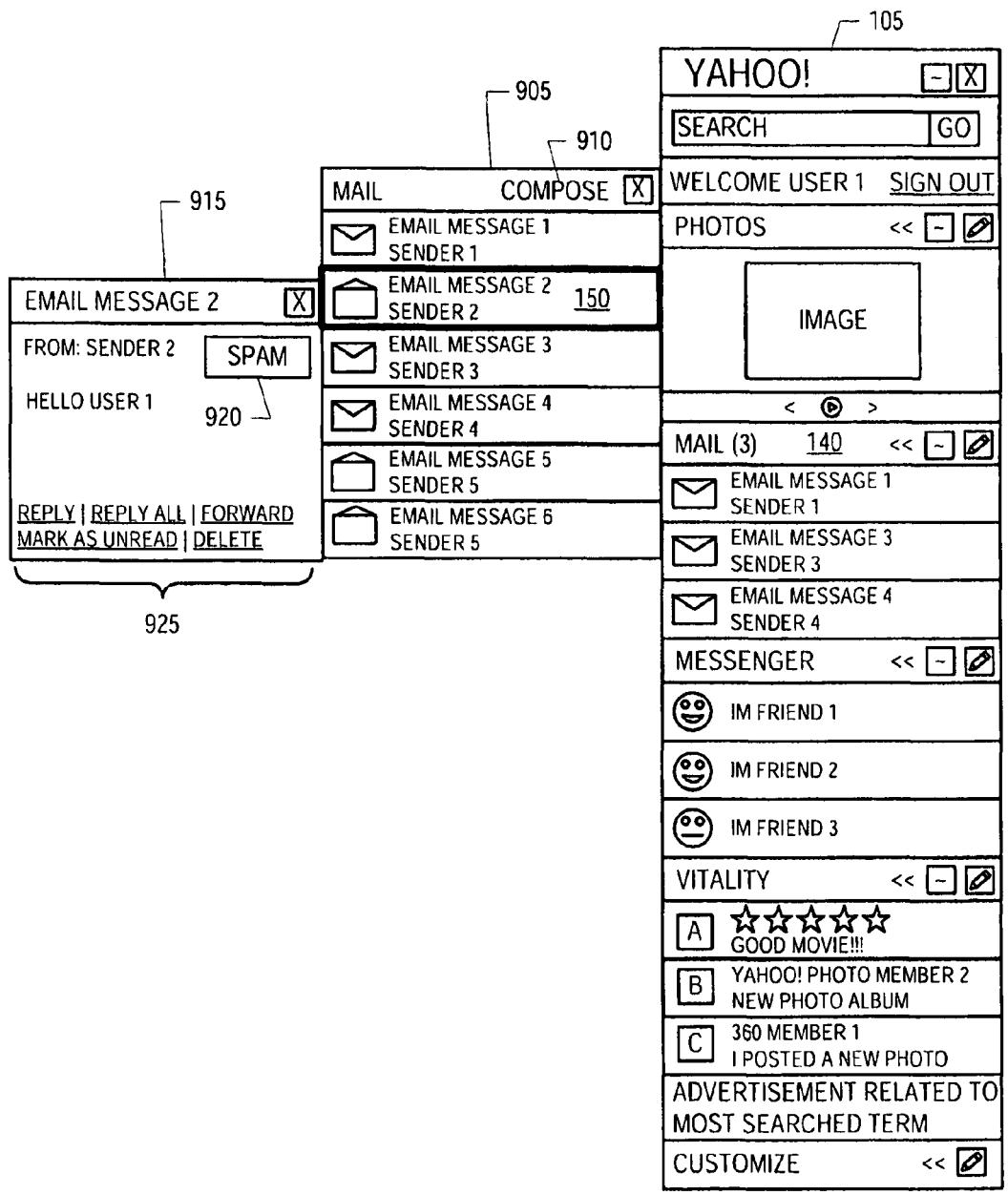
FIG. 9 illustrates an email application module implemented according to one embodiment of the invention.

In addition to using a whole number of items in the main sidebar 105, a whole number of items can also be forced in a slidesheet. FIG. 9 illustrates a slidesheet 905 for an email module 140. The mail folder slidesheet 905 comprises a whole number of messages. Increasing or decreasing the size of the slidesheet 905 produces the snapping effect of including or excluding a truncated email item.

Figure 10:
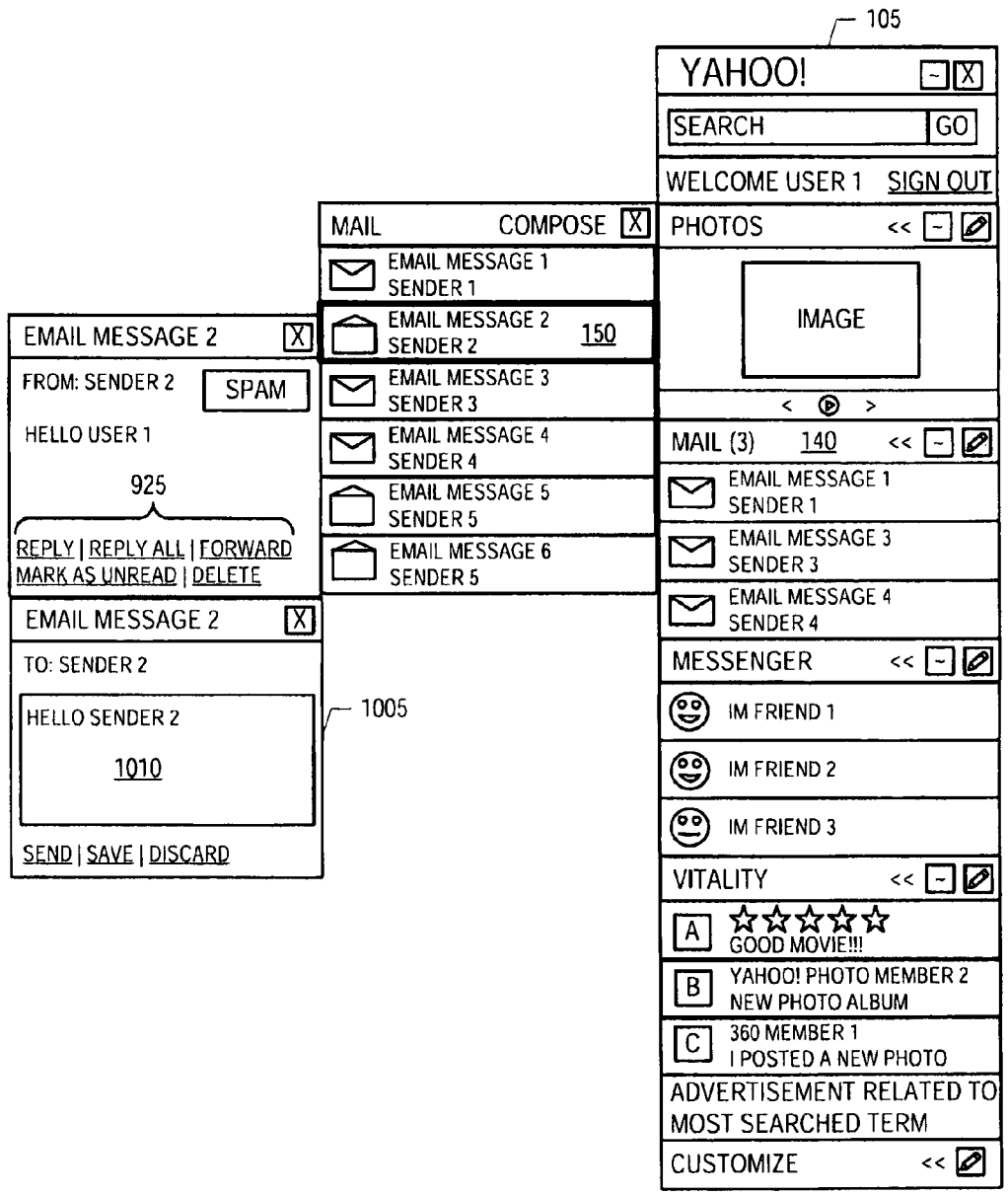
FIG. 10 illustrates an email "compose" slidesheet implemented according to one embodiment of the invention.

FIGS. 9 and 10 illustrate an email application that can be accessed through a sidebar 105. The email module 140 is displayed in a preferred open state comprising the three most current unread emails. In one embodiment, a user can display a mail folder slidesheet 905 by selecting the double arrow button in the mail module's 140 titlebar. In one embodiment, the folder slidesheet 905 defaults to the user's inbox. In one embodiment, the folder slidesheet 905 can comprise a plurality of folders identified by subtitle bars. Emails listed under a subtitle bar belong to the folder identified in the subtitle bar. In one embodiment, the folder slidesheet 905 can display a drop down menu (not shown) comprising the name of email folders. When a user selects a particular folder the emails in the folder slidesheet 905 are updated to display the emails in the selected folder.

In one embodiment, the sidebar 105 periodically polls the user's email server to determine if the user received any new emails. In one embodiment, the sidebar 105 can monitor whether another email application running on the user's computer has received a new email. In one embodiment, the sidebar 105 can detect if another application has detected a new email or the application that detected the new email can alert the sidebar of the new email. In one embodiment, the sidebar 105 can receive an alert indicating that a new email has been received. The alert receiving module can be part of the sidebar 105, or part of another application. If the alert is received by another application, the reception of the alert can be detected by the sidebar 105, or the other application can inform the sidebar 105 that an alert was received. The alert can be sent by the email server or a more general alert server, which monitors for updates across all of a content provider's services.

In one embodiment, the user can receive emails informing the user that changes were posted to a community website by another community user. For example, a user can receive an email when a social networking member updates their blog, sends them an invitation, or performs other social networking activities. In one embodiment, the user can receive an email informing them that an update has been made to their online photo sharing service. For example, a new photo could have been posted and/or a new comment could have been made. These community update emails can comprise a link to the updated information. In one embodiment, selecting the link initiates a browser, where the user can access the full version of the updated community information. In one embodiment, selecting the link can open a vitality slidesheet, which will be discussed below.

In FIG. 9, the user has selected email message 2 150 in the folder slidesheet 905. When the user selects the email item 150, the email message is opened in an item level email slidesheet 915. The email slidesheet 915 comprises the subject of the email message in the titlebar, a "from" field, the body of the message, a spam control button 920 and email controls 925. Additionally, when the email message 150 is opened, the email item 150 is highlighted, the envelope is changed to an open envelope, email message 2 150 is removed from the mail module 140 display area, and the number in the titlebar is decreased to reflect the new number of unread emails in the user's inbox. In one embodiment, user actions in the mail module 140, such as, for example, opening an email, are sent to the full service mail server. Thus, changes made to a user's email in the sidebar 105 are reflected in the user's full service email application.

The email slidesheet 915 comprises a spam control button 920, which provides the user with direct access to strengthen their full service spam controls by identifying spam from their sidebar 105. If the user identifies an email as spam, they can select the spam control button 920. In response to the selection of the spam control button 920, the sidebar 105 sends a message to the full service email server indicating that the selected email is spam. Then the full service email server incorporates the received information into the user's spam settings thereby strengthening the user's spam protection.

In addition to spam controls, a user can access other mail functions through the sidebar 105 by selecting the email controls 925 or the compose link 910 in the folder slidesheet 905 titlebar. In one embodiment, selecting the compose link 910 opens the user's default email application so that the user can compose a message. In one embodiment, the sidebar 105 displays a slidesheet comprising a field in which the user can compose a new message, a field for a recipient and a field for a subject. The composed message is transmitted by the sidebar 105 to an email server for delivery. In one embodiment, selecting an email control 925 opens the user's default email application so that the user can perform the selected operation. In one embodiment, the sidebar displays a slidesheet from which the user can perform the selected operation.

FIG. 10 illustrates a message form slidesheet 1005 that can be displayed by the sidebar 105 when a user selects the reply link in the email controls 1025. The slidesheet 1005 comprises a "to" field, which comprises the recipient of the email, a compose field 1010, in which the user can type their message, and a plurality of controls to manipulate the reply message. For example, when the user is finished composing their message, the user can select the send link, to send the message to an email server for delivery.

The Internet allows people to connect and share thoughts in a number of different ways. For example, social networking communities allow users to add friends to their network, and thereby connected to many other people through their friends' friends. Social networking websites allow their users to post blogs, photos, blasts, and other media that a user wants to share with their group of friends, such as Yahoo! 360, offered by Yahoo! Inc. of Sunnyvale, Calif. Another example of a community network is an online photo sharing website. Photos are assigned tags and posted to a user's photo site. Other users can search for photos by user, group or tag. They can also comment on the photo. Yet another example of a community network is a review network. People know their friends tastes, so they can trust a friend's review more than another person's review. Many of these community networks provide email updates when a user's friend makes a new post. Vitality is an application module that, in one embodiment, seeks out updates to a user's community networks and lists them in a sidebar 105. Thus, the user can stay current with all their community networks without having to visit a number of different websites.

In one embodiment, the vitality module 165 can work with a user's email alerts. For example, the vitality module 165 can initiate a search for updated information in all of a user's community networks when an alert email is received from any one of the user's community networks. In one embodiment, the vitality module 165 periodically polls the user's community networks for updated information. In one embodiment, the vitality module 165 can receive an alert indicating that a user's community network has been updated. The alert can come from a general alert server, which manages all updates to a user's Internet services, and/or the alert can come from an alert application module in another application. The alert is not limited to an email, in one embodiment the alert can be a message from an alert server and/or from another application. In one embodiment, the alert also comprises the updated information.

In one embodiment, the vitality module 165 only displays community information and only receives alerts from services offered by the same company that offers the sidebar 105, in order to promote the sidebar provider's services. In other embodiments, the sidebar 105 can retrieve information and receive alerts from the sidebar provider's community sites and/or other content provider community sites by scraping, or by using the user's login and password for the specific site to collect updated information on behalf of the user. In one embodiment, emails received from third party community sites can be interpreted by the sidebar 105, and added to the vitality module 165. If the email comprises a URL that points to the updated information, the URL can be used by the sidebar 105 to retrieve and display the updated information as part of a vitality slidesheet.

Figure 11:
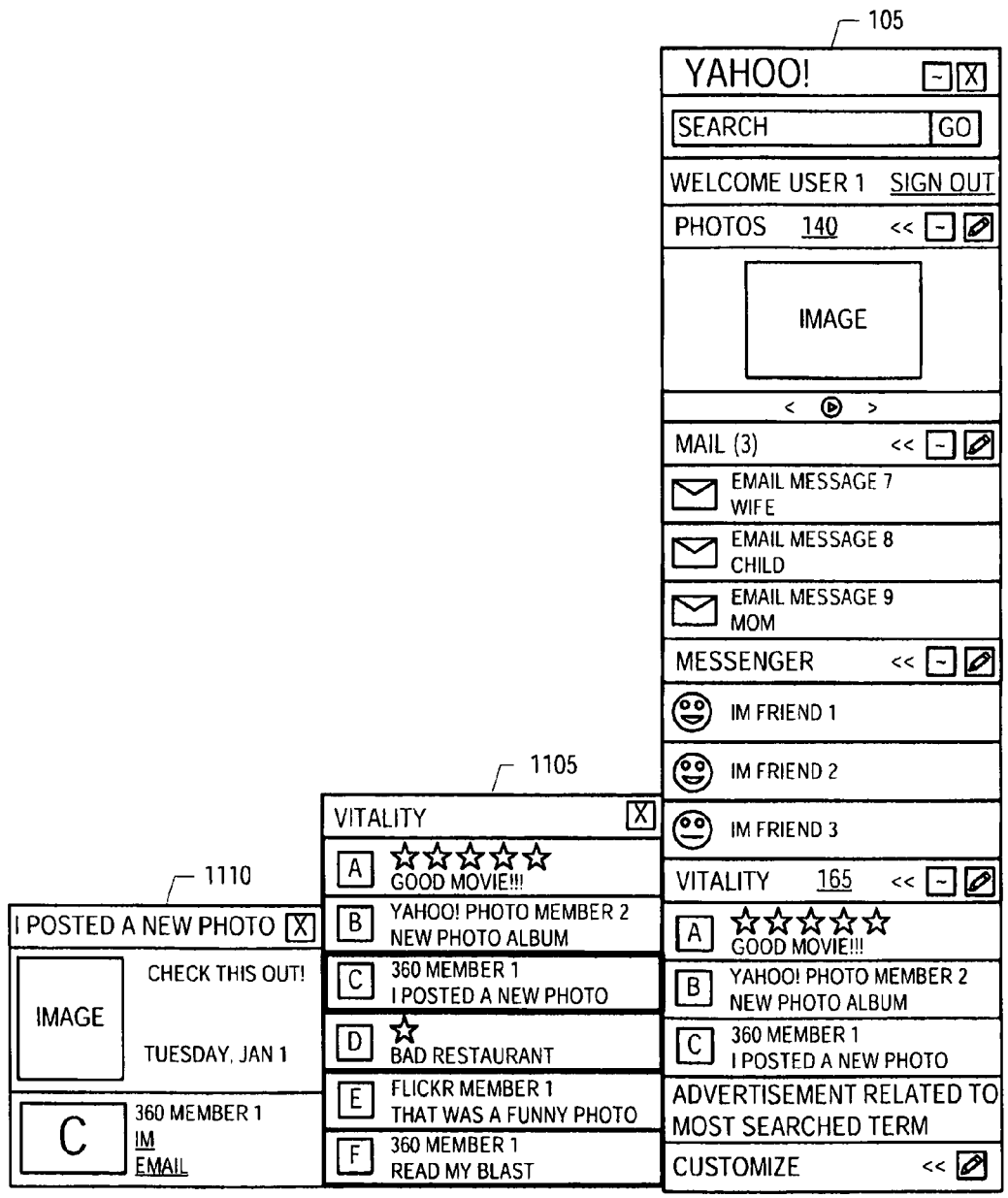
FIG. 11 illustrates a community activity updating application module implemented according to one embodiment of the invention.

FIG. 11 illustrates a vitality module 165 in a full open state. The vitality module 165 display area comprises the three latest updates from a user's community networks. The vitality module 165 comprises a movie review, the movie review comprising a visible rating system, and a preview of the review. The vitality item also comprises an image "A" associated with the user. The vitality module 165 also comprises a new post to a photo sharing website, and a new post to a social networking website. In addition, since the vitality module is part of the sidebar 105, the user can use their email module 140 for other purposes, such as, for example receiving emails exclusively from family members, as is illustrated in FIG. 11.

When the user opens a full vertical slidesheet 1105 for the vitality application module 165, for example, by selecting the double arrow button in the vitality module 165 titlebar, in one embodiment, the slidesheet 1105 comprises a list of recently updated community websites. In one embodiment, the update alerts can be grouped by a time received, by user and/or by community.

If the user selects an item in the vitality slidesheet 1105, an item level slidesheet 1110 is displayed comprising additional information about the selected vitality item. The additional information slidesheet 1110 comprises a title of the update in the titlebar, and a preview of the updated information. In one embodiment, clicking on the image of slidesheet 1110 open a browser, which navigates to the updated community webpage.

The slidesheet 1110 also comprises an image "C" associated with the user who posted the update, the updating user's identifier and links to contact the updating user, for example, an IM link and an email link. The updating user's image "C" can be the same as their IM account image, their social networking image, or taken from another application and/or service.

Figure 12:
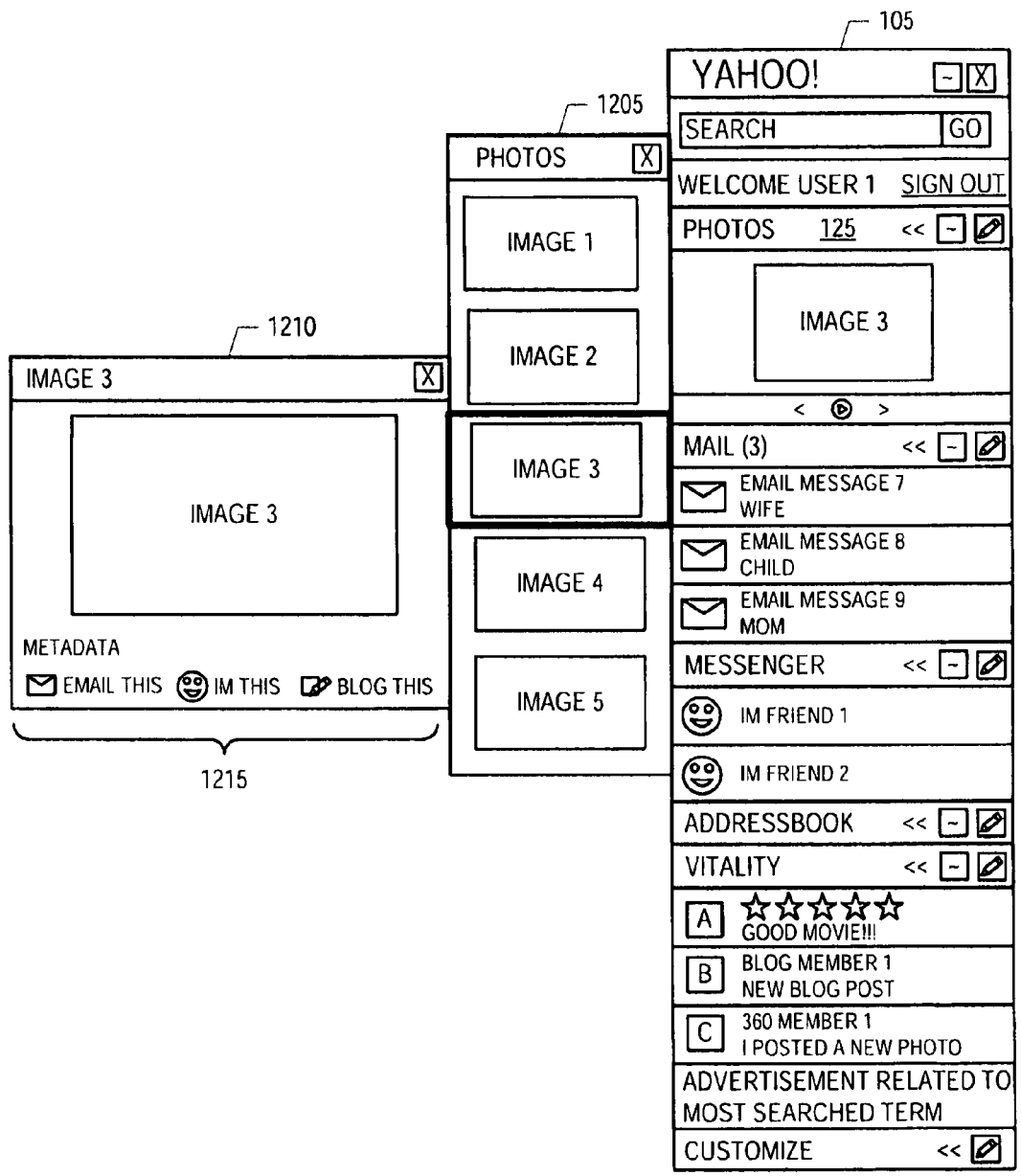
FIG. 12 illustrates a photo application module implemented according to one embodiment of the invention.

A sidebar 105 can also comprise a photo module 125, which can display a slideshow of images obtained, for example, from a user's computer, from a photo sharing service, from a photo database, and from other photo sources. FIG. 12 illustrates a photo slidesheet 1205 for a photo module 125. The photo slidesheet 1205 displays a vertical column of photos that are part of the slideshow. In one embodiment, the photo currently displayed in the sidebar 105 is centered and highlighted in the photo slidesheet 1205. In one embodiment, the photo is highlighted by a border around the image. In one embodiment, the brightness of the image can be adjusted to highlight the photo. In one embodiment, the photo slidesheet 1205 also comprises the last two images displayed in the sideshow and the next two images will be displayed in the sideshow.

Selecting one of the images opens an image slidesheet 1210. The image slidesheet 1210 comprises the name of the photo in the titlebar, a larger version of the image, metadata associated with the image and sharing buttons 1215, which the user can select to share the image. In one embodiment, the metadata is a file directory for the image. In one embodiment, the metadata can comprise a URL of the image.

The sidebar 105 allows the user to receive and view a variety of different media. For example, the sidebar 105 allows the user to view photos shared on an online site, read reviews from community users, obtain weather forecasts, obtain financial information and obtain other information. Currently, there is no convenient way for a user to share the information they access through the sidebar 105 with other people. Therefore, in one embodiment, the sidebar 105 and/or sidebar 105 slidesheets can comprise sharing buttons on the same slidesheet as sharable information. For example, slidesheet 1210 comprises sharing buttons 1215. The user can select the email button to email the image to another user, the IM button to IM the image to another user, or the blog button to post the image on a blog. In one embodiment, selecting a sharing button initiates a full service.

Sharing icons are not limited to a photo module. Any information, media or data that can be shared with other users can be displayed in a slidesheet with sharing buttons so that the user can easily share the data with other users.

In one embodiment selecting a sharing icon 1215 initiates a separate application associated with the desired action. For example, selecting the email button can open a user's default email application, selecting the IM button can open an IM program and selecting the blog button can open a browser which takes the user to their blogging webpage.

Figure 13:
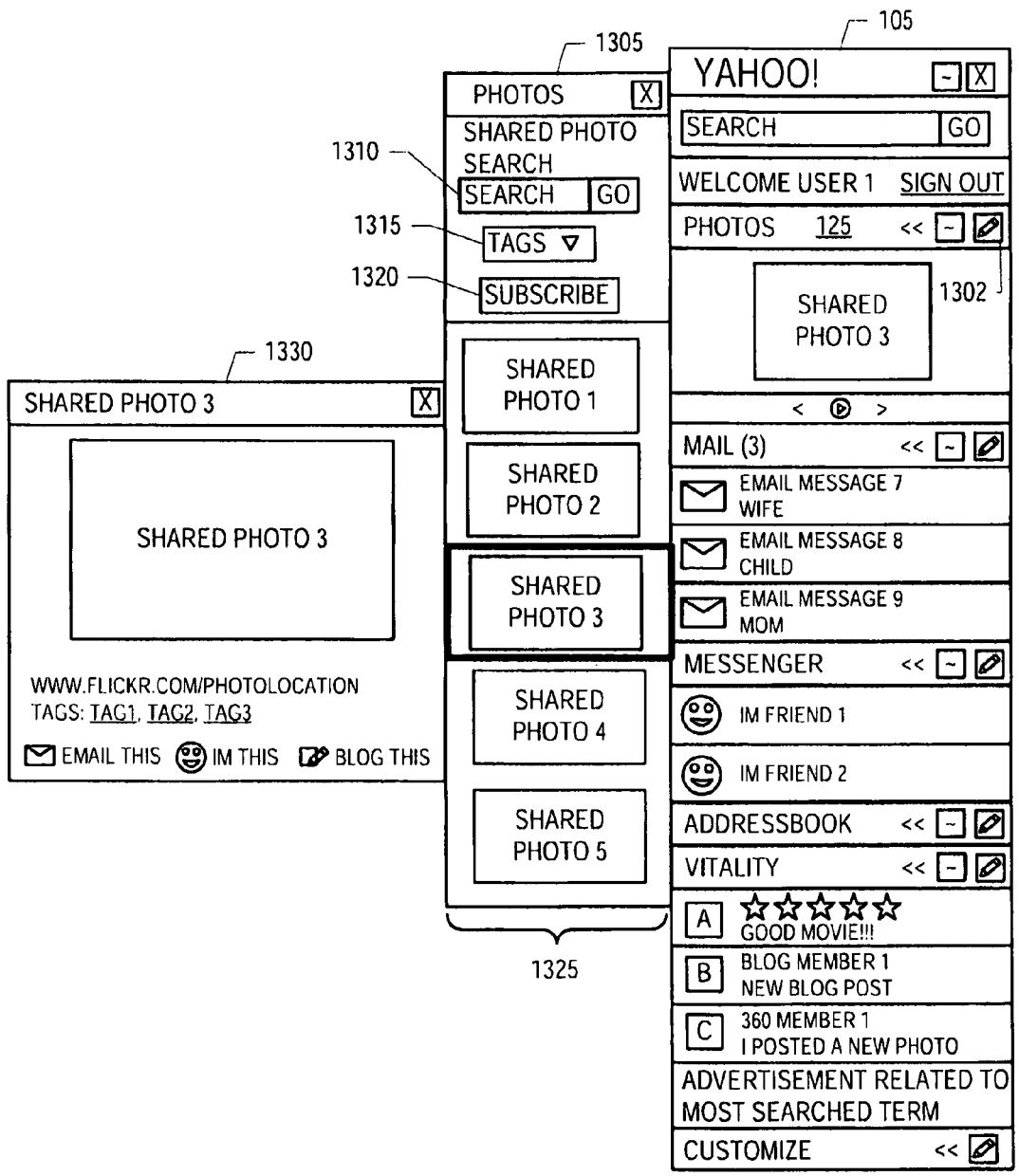
FIG. 13 illustrates a slidesheet comprising easily accessible sharing buttons displayed on the same slidesheet as shareable media.

FIG. 13 illustrates one embodiment of a photo module 125 in which the slideshow comprises photos from a online photo sharing community, such as, for example, Flickr. Flickr uses tags to label the photos on its site, and users can search and view photos by tag. For example, searching for the term "cats" will show all images including the tag "cats" and/or images with tags similar to "cats". In one embodiment, a user can search for, and subscribe to tagged images through an editing dialog (not shown), which can be initiated from a drop down menu displayed when a user selects edit button 1302. Subscribing to a tag adds photos with the tag to the user's slideshow. Since the online photo sharing community is continually updated the user's slideshow can display a large variety of photos.

In one embodiment, when a user selects the double arrow button in the photo module 125 titlebar, a photo slidesheet 1305 comprising a shared photo search field 1310, a tag drop down menu 1315, a subscribe button 1320 and a photo display area 1325 is displayed. When the slidesheet 1305 is displayed the display area 1325 comprises photos from the use's slideshow.

In one embodiment, a user can enter a search term directly from the photo slidesheet 1305. In one embodiment, the search results can be displayed in the image display area 1325, as shown in FIG. 13, and in one embodiment, the search results can be displayed in another slidesheet (not shown). If the user likes the photos from a search result, the user can select the "subscribe" button 1320 to add the tagged images to their slideshow. Past searches and tags which the user is currently subscribed to can be quickly accessed through the tag menu 1315. Selecting the arrow in tag menu 1315 displays a drop down menu with a plurality of tags that the user can select.

When a user selects a photo in the photo slidesheet 1305, an item level slidesheet 1330 comprising the selected photo is displayed. The slidesheet 1330 comprises the location of the photo and the tags that are associated with the photo. In one embodiment, when a user selects a tag in the slidesheet 1330, a random selection of photos having the selected tag are displayed in the slidesheet 1305.

Figure 14:
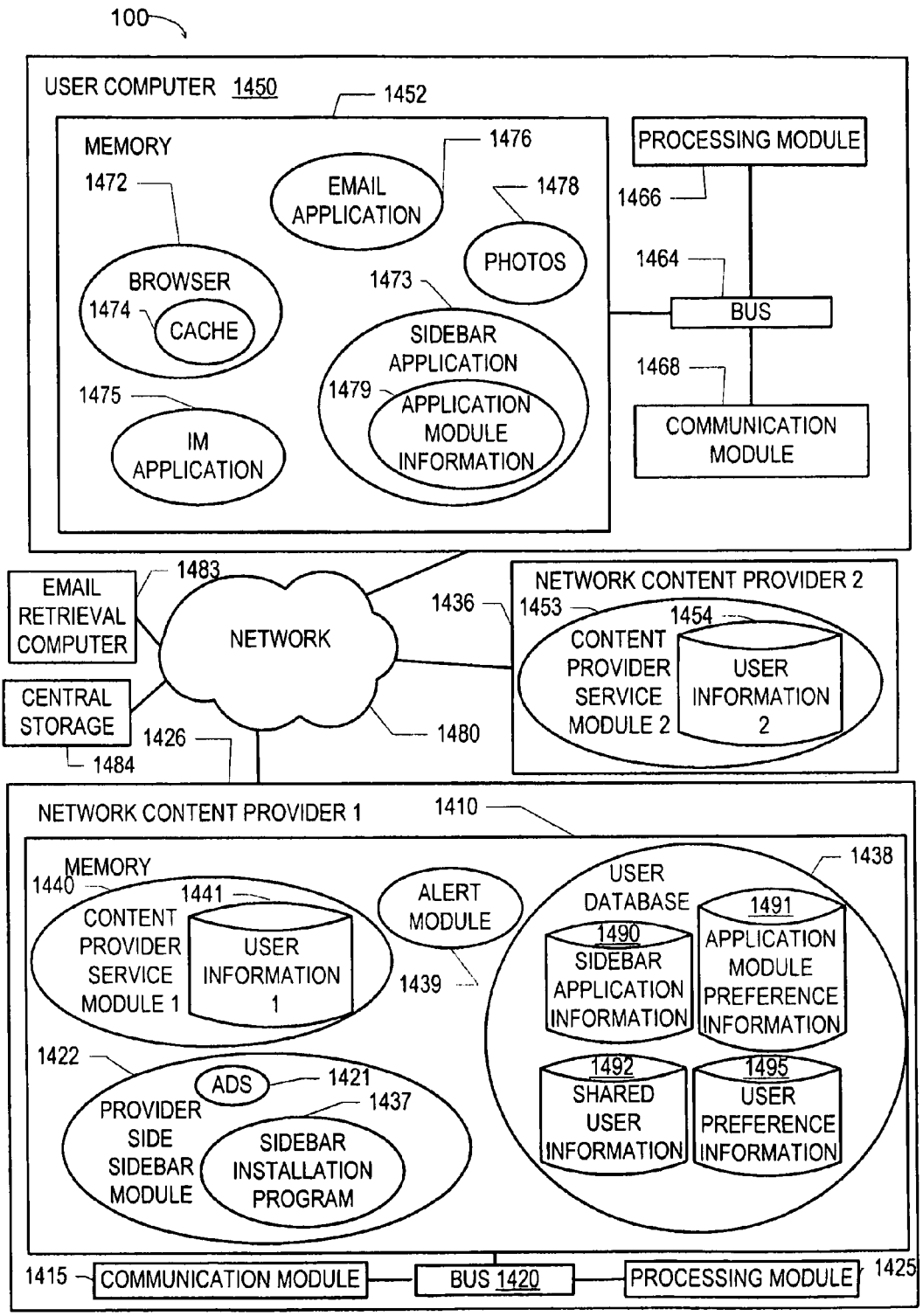
FIG. 14 illustrates a system implemented according to one embodiment of the invention.

FIG. 14 illustrates a block diagram of a system 100 implemented in accordance with one embodiment of the invention. System 100 comprises a user computer 1450, an email retrieval computer 1483, a network content provider one 1426, and a network content provider two 1436, each coupled to a network 1480, such as, for example, the Internet 1480. Although illustrated as one symbol, nodes of network 1480 may be coupled together by a combination of different networks. A network user can use computer 1450 to access content and/or services from providers 1426 and 1436 through the network 1480.

Computer 1450 comprises a processing module 1466, a communication module 1468 and memory 1452 coupled together by bus 1464. The modules of computer 1450 can be implemented as any combination of hardware, software, hardware emulating software and reprogrammable hardware. The bus 1464 need not be a single bus, but rather, illustrates the interoperability of the different modules of the computer 1450. In one embodiment, there may be multiple busses. In one embodiment, some modules are directly coupled instead of coupled via a bus 1464. Computer 1450 may be implemented as a desktop, a notebook computer, a Personal Digital Assistant (PDA), a handheld device, a wireless phone or any other computing device or item known or hereafter developed that is capable of implementing the features, and/or performing functions, as described herein.

In one embodiment, the processing module 1466 can be implemented as, one or more Central Processing Units (CPUs), Field-Programmable Gate Arrays (FPGA), or any other component capable of executing computer applications. Communication module 1468 comprises one or more I/O components used by the computer 1450 to communicate with users and other devices. For example, components such as, a monitor, a keyboard, a mouse and a disk drive, can be used by a user to input and output information to and from the computer 1450.

In addition, the communication module 1468 facilitates two way communication between the computer and other electronic devices or systems, such as, for example, server computers provided by a network content provider one 1426 and/or two 1436. Components such as a modem, a network interface card (NIC), a wireless adapter, a Universal Serial Bus (USB) adapter, etc., can be used by the computer 1450 to communicate with the network 1480, and/or with peripheral devices. The computer 1450 may be communicatively connected to the network 1480 through the communication module 1468, for example, over one or more transmission media including but not limited to coaxial cable, copper wires and fiber optic cables. Communication between the computer 1450 and the network 1480 may also be accomplished via wirelessly.

In one embodiment, memory 1452 provides electronic data storage using a combination of main memory (e.g., RAM) and drive storage. Any type of appropriate electronic memory can be used, including, without limitation, RAM, ROM, drive storage (hard, floppy, optical, etc.), non-volatile memory (e.g., flash) or any other memory that can store data. While memory 1452 is illustrated with single box around it in FIG. 14, memory 1452 can comprise one, two or more different types of memory modules. In addition, memory 1452 can be part of other modules of computer 1450, such as, for example, processing module 1466, such as, for example in a processing module, which performs a specific purpose.

In one embodiment as illustrated in FIG. 14, memory 152 has stored thereon a sidebar application 1473, a browser 1472 with cache 1474, a IM application, 1475, an email application 1476, photos 1478 and application module information 1479. Specific implementations of the modules are described below.

Network content provider one 1426 comprises communication module 1415, processing module 1425 and memory 1410 coupled together by bus 1420. Communication module 1415, processing module 1425, memory 1410 and bus 1420 can be implemented with components that are similar to the like named components of computer 1450. The memory 1410 of network content provider 1426 has stored thereon, a sidebar installation module 1437, a content provider service module one 1440 with user information 1441, a user database 1438, and an alert module 1439. FIG. 14 illustrates one embodiment of a network content provider one 1426, in alternate embodiments, the modules of network content provider one 1426, can be split among a plurality of computers. For example, in one embodiment, network content provider two 1436, also provides an Internet service, and therefore comprises a content provider service module two 1453 with user information 1454. In one embodiment, network content provider one 1426 and network content provider two 1436 are run by the same company. In one embodiment, network content provider one 1426 and network content provider two 1436 are run by independent companies.

In one embodiment, the sidebar application 1473 can be operable to display a sidebar 105 on a user's computer as described above. The sidebar 105 comprises one or more application modules that provide some or all of the services of a principle application. For example, an email module can comprise unread emails sent to the user. In one embodiment, a user can obtain a sidebar application 1473 by using a browser 1472 to navigate to one of network content provider one's 1426 webpages. Through the webpage, the user gains access to a sidebar installation program 1437, which can be used to install the sidebar application 1473 onto the user computer 1450.

In one embodiment, during installation, the sidebar application 1473 searches the user's computer for a username and password to the user's content provider account. For example, the sidebar application 1473 can search in the browser's cache, and/or in another application provided by the content provider, such as, for example, an IM application 1475 or a music engine (not shown). In one embodiment, the sidebar application 1473 can ask the user for a username and password.

If the user does not have an account or if no username and password are provided, the sidebar application 1473 can load a default setting. In addition, in one embodiment, the sidebar application 1473 can forward the user to a website from which the user can sign up with the content provider 1426. The default sidebar settings for a non-member can comprise application modules that are most popular with member users, application modules for services that the content provider would like to promote, application modules based on the programs installed on the user's computer, random application modules, and other factors.

If the sidebar application 1473 obtains a valid username and password, it contacts the network content provider one 1426 for the user's sidebar preferences or sidebar application information 1490, which, in one embodiment, are stored in the content provider's user database (UDB) 1438. In one embodiment, the user's sidebar preferences 1490 comprise the types of application modules in the sidebar, the display state of the application modules and dimensional information for application modules in an open state.

In one embodiment, user database 1438 comprises user specific information that can comprise sidebar application information 1490, application module preference information 1491, shared user information 1492 and user preference information 1495. User database 1438 information can be obtained through a user's interaction with network context provider one 1426, either through explicit data collection or implicit data collection based upon user behavior, as well as interaction with the sidebar 1473 application.

In one embodiment, user database 1438 comprises sidebar application information 1490, which can include, for example, information that defines how the sidebar 1473 is displayed to a user, e.g. the types of application modules that are loaded into the sidebar 1473, whether the sidebar 1473 is on the left or right of the desktop, its size, and whether certain modules are initially in a particular state.

User database 1438 can also comprise user preference information 1495, which comprises user preferences for other applications. For example, when a content provider offers multiple services, and they are utilized by a user, the user's interactions with these services can yield preference information regarding many categories, such as, for example, musical tastes, products used and/or purchased, topics researched, games played, sports followed, regions traveled, movies and restaurants reviewed, etc. This information can be yielded by direct or explicit data collection of preferences through rating selection for products and/or services, and/or by implicit data collection through observed behavior and interaction with a content providers' products and/or services.

User preference information 1495 can be used to select default modules and to select targeted advertisements to send to a user. In one embodiment, the user preference information 1495 is part of the shared user information 1492, and in one embodiment, the user preference information 1495 is part of user information from an independent content provider service.

In one embodiment, user database information 1438 can be processed to yield other information useable by the sidebar 1473 and/or other applications. For example, user database information 1438 can reflect that a user uses a content provider's email service more then IM, so that in a default condition (e.g. a user's first interaction with the program) the sidebar program displays an email application module without asking a user for configuration information. In one embodiment, the sidebar 1473 can default a service that is never or rarely used by a user so that the content provider can encourage the user to use additional services.

The user database 1438 can also comprise application module preference information 1491 that specifies user options or preferences related to each application module the user interacts with. For example, if the user utilizes the email application module, the user's application module preference information 1491 can reflect that the user prefers to see only unread emails, for example, or for IM, only the last three friends the user messaged, or for photos which photos are to be viewed in a slideshow.

User database 1438 can also comprise shared user information 1492. Shared user information is information in user database 1438 that is shared by other applications or services of a content provider(s). For example, the cities which a user wishes to see weather reports for, can be shared by a weather application module in the sidebar 1473, as well as an Internet based weather program. Stocks to be tracked and addresses to be mapped are additional examples, of shared information. Other shared information can comprise the user's name, address, telephone number and other personal user information.

In one embodiment, the application module preference information 1491 can comprise preference information regarding the shared user information 1492. For example, while the shared user information may comprise, the cities which a user wishes to see weather reports for, the application module preference information 1491 can comprise the order in which the cities appear in the sidebar 1473. In one embodiment, each application module separately obtains application module preference information 1491. In one embodiment, the sidebar 1473 retrieves the application module preference information 1491 and provides it to the application module.

In one embodiment, the user information one 1441 of content provider service module one 1140 may comprise all or a subset of information found in a user database 1438, and may in implementation be the same data in a single database or two or more different data images that are routinely synchronized. In one embodiment, user information one 1441 is information that is specific to the content provider service module one 1140, and comprises information that is not found in user database 1438.

While these information types are described as discrete in the above example, it will be recognized from the teachings herein that each information category can contain information useable by the sidebar 1473, the application modules, or other programs or services, and such information may be stored at a single location or multiple locations as part of a single or distributed database or at any location on a network in any form or format.

If this is the first time the user is using the sidebar 1473, the content provider 1426 can load the sidebar 1473 with a default set of application modules. As mentioned above, in one embodiment, the default set of application modules is created based on information in the UDB 1438, user information from other network content provider services 1440, applications on the user's computer, and from other sources.

As mentioned above the UDB 1438 can comprise user information from a plurality of different services. Thus, when creating the default set of sidebar application modules, the content provider 1426 can choose the application modules based on the principal applications that the user uses most or least, based on the principal applications that store the most information and/or based on other information stored on the UDB 1438. For example, if a user frequently accesses their online address book, the sidebar 1473 can be loaded with an address book module. In one embodiment, the sidebar 1473 looks to the applications loaded on the user's computer 1450, to set the default application modules for the sidebar 1473. In one embodiment, an initial sidebar comprises application modules that the content provider 1426 wants to promote, such as, for example, new service or under utilized services.

Each application module in the sidebar 1473, obtains application module information 1479 to display to the user. In one embodiment, the application module information 1479 is a subset of information available to the user in a principal application. In one embodiment, the sidebar 1473 stores a copy of the application module information 1479 on the user's computer 1450. In one embodiment, the sidebar 1473 can access the subset of information it displays from the same source as the principal application, whether the application is a local application or an online service. As mentioned above, some of the application module information 1479 can be shared information, and some of the application module information 1479 can be application module specific. In one embodiment, the application module information 1479 comprises the application module preference information 1491.

In one embodiment, an address book module can search a user's computer for application module information. In one embodiment, the sidebar 1473 can load information from one or more principal applications. For example, the user may have an online address book with a content provider 1426 and an address book on their local computer 1450. In one embodiment, the sidebar 1473 can obtain address book information from one or both the online address book and the local address book. For example, Outlook (a program provided by Microsoft, Inc. of Redmond, Wash.) contact files can be searched and loaded into an address book module. In one embodiment, the complete Outlook user interface does not have to be displayed for the sidebar 1473 to retrieve a user's contact files. The sidebar can retrieve the information from an Outlook API. However, if Outlook is not running, and there is more than one profile in existence, the sidebar 1473 determines which profile to access. In one embodiment, the sidebar 1473 can use some logic to guess the correct profile, such as, for example, picking a profile with a similar name to the sidebar user. In one embodiment, the sidebar can ask the user to pick a profile. If the selected profile is password protected and the sidebar cannot retrieve the password from another source (e.g., a password storing application), then the sidebar 1473 retrieves the password from the user. Both profile and password information can be retrieved from a user by invoking a default MAPI logon dialog to prompt for the information.

A user can adjusts the preferences for the sidebar, such as, the types of application modules, their display states, their size, their order, which principal application(s) they retrieve information from, and other preferences. These preferences are transmitted to the content provider 1426 and saved on a server, for example on the UDB 1438, so that the user can have the same sidebar experience on any computer with an Internet connection. In addition, in one embodiment, updates made to user information through the sidebar 1473 are sent to the content provider and stored in the appropriate location, i.e., the UDB, user information one 1441 and/or user information two 1454, so that the user's updates are reflected in the principal application.

Targeted advertisements, email modules, community updates, information sharing and other sidebar functions are described in greater detail below.

The location and number of the network content provider computers, databases and modules in FIG. 14 illustrate one embodiment of the invention. In alternate embodiments, for example, for scalability, security or backup purposes the location and number of the network content provider computers, databases and modules can be omitted, expanded and interchanged without exceeding the scope of the invention.

Figure 15:
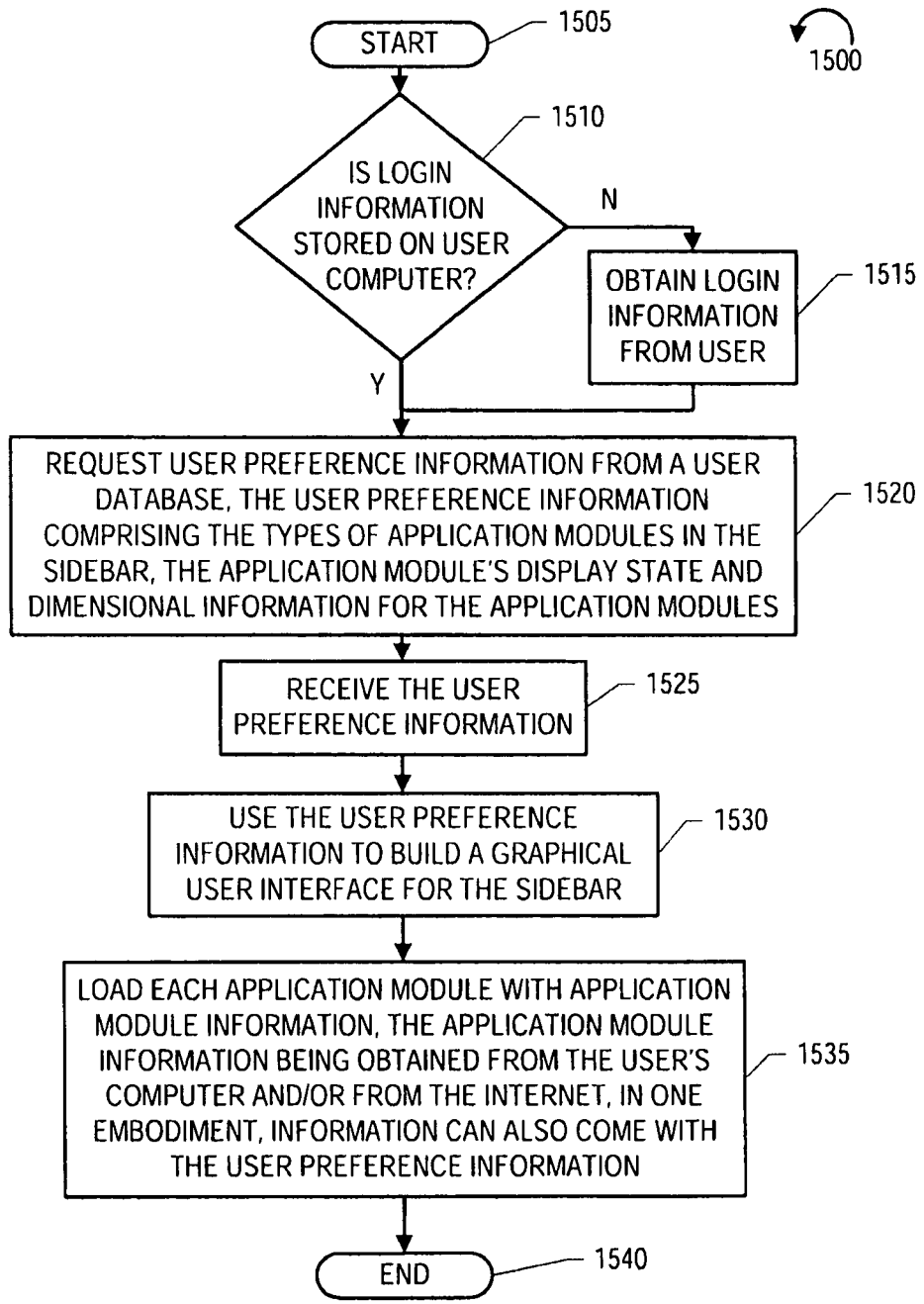
FIG. 15 illustrates a sidebar-building method implemented according to one embodiment of the invention.

FIG. 15 illustrates a method 1500 for building a sidebar implemented according to one embodiment of the invention. Method 1500 starts in step 1505. Then, method 1500 proceeds to step 1510, where a sidebar determines if login information is stored on a user's computer, for example, in a cookie in a browser cache. The login information can also be obtained from another content provider application. Searching for login information on the user's computer provides the user with a Single Sign On (SSO) experience across one content provider's services. If login information is not stored on a user's computer, method 1500 proceeds to step 1515, where a sidebar obtains login information from a user. In one embodiment, the sidebar will display a slidesheet comprising fields for the user to enter their user name and password.

Returning to step 1510, if login information is stored on the user's computer method 1500 proceeds directly to step 1520, where a sidebar requests user preference information from a user database. In one embodiment, the user database is maintained by an Internet content provider who provides the sidebar 1473, and the user's sidebar preferences are stored on a content provider computer 1426. In one embodiment, the user preference information comprises the types of application modules in the user's sidebar 1473, the application modules' display state, and dimensional information for the application modules.

Following step 1520, method 1500 proceeds to step 1525, where the sidebar 1473 receives the user preference information, for example, from a content provider computer 1426. In one embodiment, the application module information can be obtained from the user's computer, for example, in an "offline" embodiment. In one embodiment, the user preference information also comes with some application module information that can be loaded into an application module. Then method 1500 proceeds to step 1530, where the sidebar 1473 uses the user preference information to build a graphical user interface (GUI) for the sidebar 1473. In one embodiment, the sidebar is displayed on the right hand side of a desktop and is available for a user to access their Internet services.

In step 1535, each application module retrieves and loads application module information associated with the type of the application module. The information can be obtained from the user's computer 1450, from a UDB 1438, from a content provider service module 1 1440, content provider service module 2 1453, from the Internet and from other sources. As described above, in one embodiment, the application module information is a subset of the service module information. Each application module can continuously update itself with new information. Method 1500 ends in step 1540.

Figure 16:
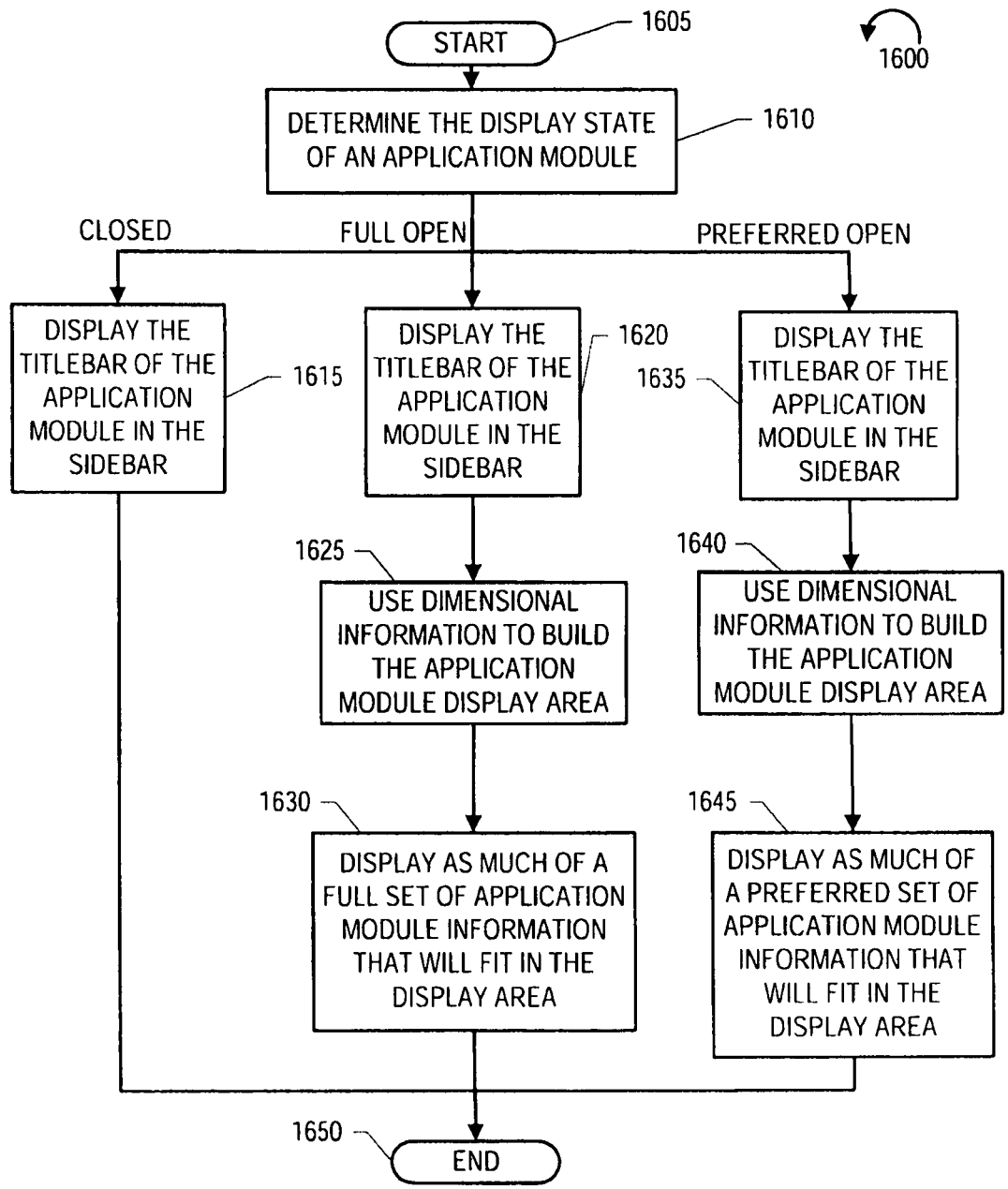
FIG. 16 illustrates a method for displaying an application module in a sidebar based on a display state of the application module.

There is typically a limited amount of desktop space for a user's application modules. Therefore, in one embodiment, application modules can have one of at least three states: a closed state, a full open state, and a preferred open state. FIG. 16 illustrates a method 1600 for displaying an application module based on its display state. In one embodiment, method 1600 can be part of the GUI building step 1530 of method 1500. Method 1600 starts in step 1605. Then in step 1610, the sidebar 1473 determines the display state of an application module.

If the display state for the application module is closed, in one embodiment, method 1600 proceeds down the "closed" path to step 1615. In step 1615, the sidebar 1473 displays the titlebar of the application module in the sidebar. In one embodiment, the titlebar comprises the name of the application module and controls for manipulating the application module. Then method 1600 ends in step 1650.

Returning to step 1610, if a display state for the application module is full open, in one embodiment, method 1600 proceeds down the "full open" path to step 1620, where the sidebar 1473 displays the titlebar of the application module in the sidebar 1473. Then in step 1625, the sidebar uses the dimensional information to build a display area for the application module. Following step 1625, in step 1630, the sidebar displays as much of a full set of application module information that will fit in the display area. As described above, in one embodiment, a full set of application module information means all the user information that is available through an application module. The principal counterpart application can still comprise additional information that the user cannot access through a sidebar. For example, the full set of emails available to a user through a sidebar 1473 can be limited to their inbox. If the user wants to view their sent mail they can use their principal email application. Method 1600 ends in step 1650.

Returning to step 1610, if a display state for the application module is preferred open, in one embodiment method 1600 proceeds down the "preferred open" path to step 1635, where the sidebar 1473 displays the titlebar of the application module in the sidebar 1473. Then in step 1640, the sidebar 1473 uses the dimensional information to build a display area for the application module. Following step 1640, in step 1645, the sidebar 1473 displays as much of a preferred set of application module information that will fit in the display area. In one embodiment, a preferred set of application module information is a subset of the full set of application information. In one embodiment, a preferred set of application module information for an IM module can comprise the last few users the sidebar user conversed with. In one embodiment, a preferred set of module information for an email module can comprise unread emails, or unread emails from a user's family. Method 1600 ends in step 1650.

In one embodiment of the invention, a sidebar 1473 only provides a preferred open state, where the preferred application module information is the full set of information available to a user through a sidebar 1473.

Some application modules, such as, for example, an online address book or an online calendar, comprise user information stored on an Internet content provider computer 1426. In one embodiment, this information can be accessed through a sidebar 1473. In addition, in one embodiment, the user can edit their user information through the sidebar 1473. Edits made to a user's information are reflected in the application module's counterpart principal application using a browser or another application.

Figure 17:
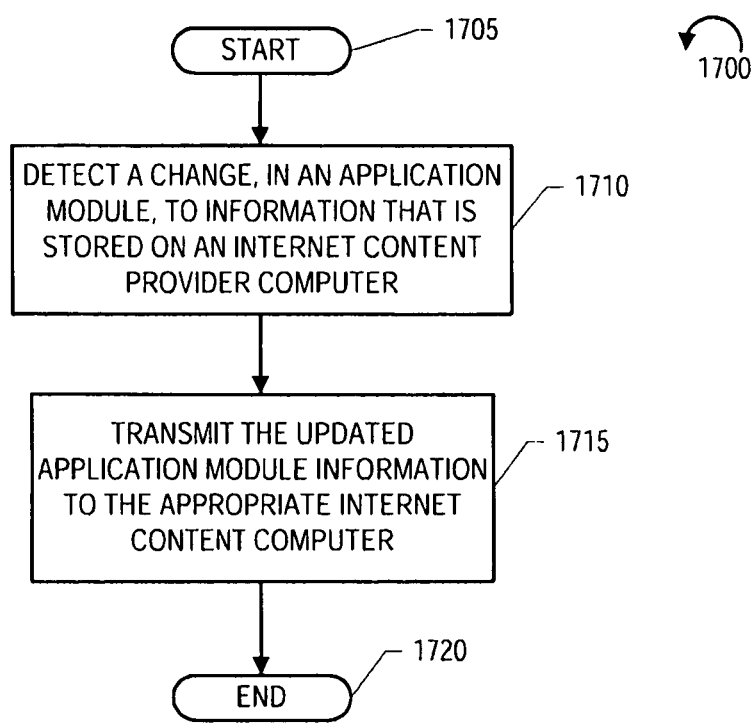
FIG. 17 illustrates an application module information updating method implemented according to one embodiment of the invention.

FIG. 17 illustrates a method 1700 for updating user information through a sidebar. Method 1700 starts in step 1705. Then in step 1710, the sidebar 1473 detects a change in an application module to information that is stored on an Internet content provider computer 1426. Following step 1710, in step 1715, the sidebar transmits the updated application module information to the appropriate Internet content computer 1426. In one embodiment, in an email module, if a user reads an unread email, the sidebar 1473 transmits a message to the user's email service indicating that the email has been read. In one embodiment, the sidebar 1473 can send a message, for example, using HTTP, to the email server. In one, embodiment, a user can make a change to a user's address book entry through a sidebar 1473 slidesheet. When the user saves their changes, the sidebar transmits the changes to a content provider 1426 so it can update the user's UDB 1438. Method 1700 ends in step 1720.

Figure 18:
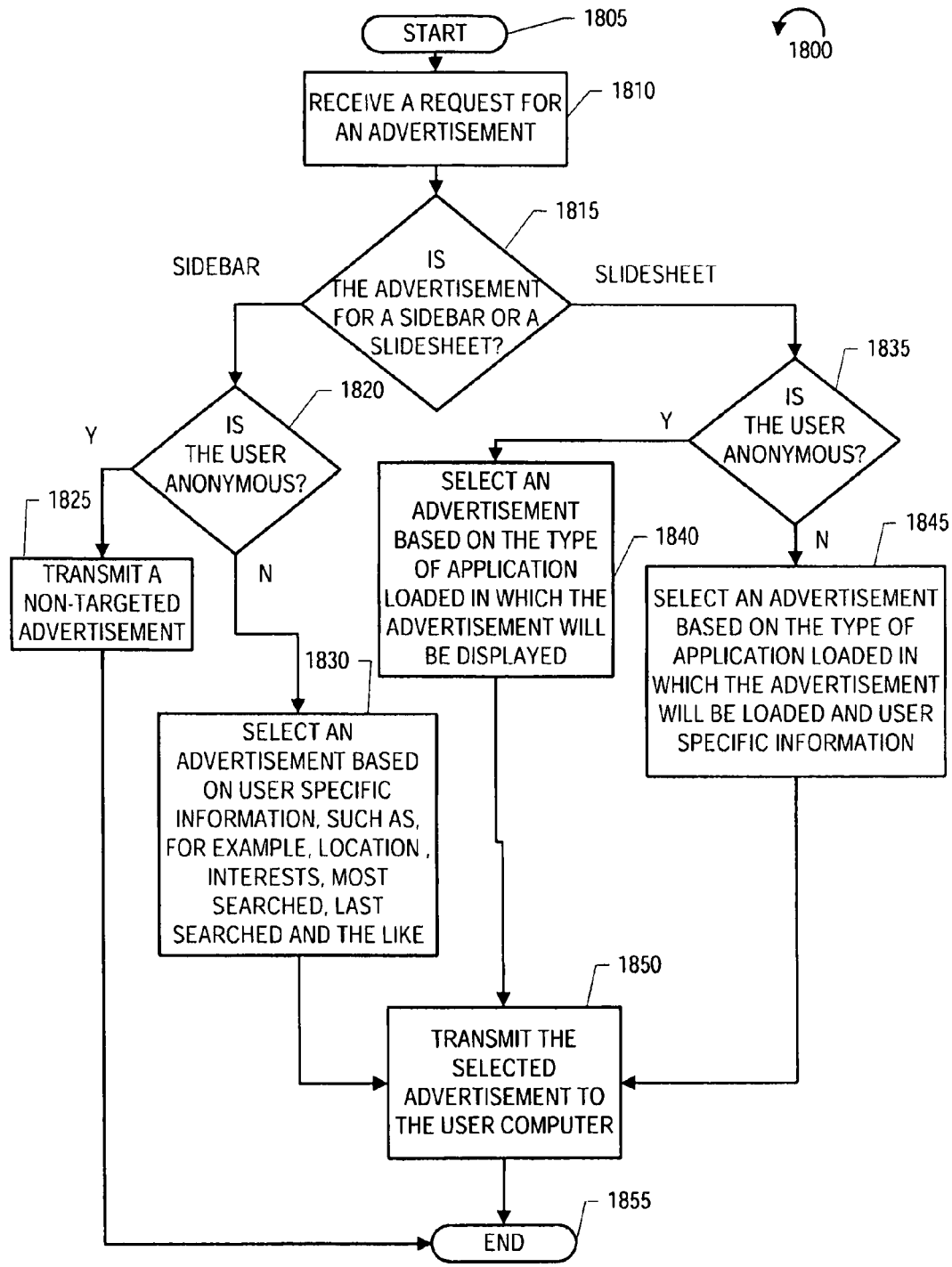
FIG. 18 illustrates a targeted advertisement selection method implemented according to one embodiment of the invention.

FIG. 18 illustrates a method 1800, implemented according to one embodiment, for selecting targeted advertisements to insert into the sidebar 1473 and/or slidesheets of a user. Method 1800 starts in step 1805, then method 1800 proceeds to step 1810, where a provider side sidebar module 1422 receives a request for an advertisement from a sidebar application 1473. In one embodiment, a request can be sent by a sidebar 1473 because the sidebar application is initially loading, the sidebar is refreshing, or the user is opening a slidesheet. A request can comprise a username and can indicate whether the advertisement is for a sidebar or a slidesheet. If the advertisement is for a slidesheet, the request can also comprise a type of application module the slidesheet was initiated from.

Following step 1810, in step 1815, the sidebar provider computer 1426 determines whether the advertisement is for a main sidebar 1473 window or for a slidesheet. If the advertisement is for the sidebar 1473, method 1800 proceeds down the "sidebar" path to step 1820. In step 1820, if the user of the sidebar 1473 is anonymous, then method 1800 proceeds to step 1825, where a non-targeted advertisement is transmitted to the sidebar 1473. Then, method 1800 ends in step 1855.

Returning to step 1820, if the user is not anonymous, for example, a content provider member is signed into the sidebar 1473, then method 1800 proceeds to step 1830, where the sidebar module 1422 selects an advertisement based on user specific information, such as, for example, the user's location, the user's interests as obtained by user input to preference selections presented by the content provider, or by the content provider through data collection related to the user's interaction with the various services of the content provider, terms most searched by the user, the last few terms searched by the user, and other user information and/or this and other information found in user preference information 1495. For example, a user who enjoys electronic gadgets can be sent advertisements for such gadgets. After step 1830, method 1800 proceeds to step 1850, where the selected advertisement is transmitted to the user computer 1450. Following step 1850, method 1800 ends in step 1855.

Returning to step 1815, if the advertisement is for a slidesheet, method 1800 proceeds down the "slidesheet" path to step 1835. If the user is anonymous, method 1800 proceeds to step 1840, where an advertisement is selected based on the type of application in which the advertisement will be displayed. For example, a slidesheet for an online radio player can display an advertisement to purchase the currently playing song, or a digital audio player that is compatible with the content provider's music service. Then method 1800 proceeds to step 1850, and ends in step 1855.

Returning to step 1835, if the user is not anonymous, then method 1800 proceeds to step 1845, where an advertisement is selected based on the type of application module in which the advertisement will be displayed, and user specific information. For example, a slidesheet for a map module initiated by the gadget lover can comprise the latest handheld GPS navigation system. Then method 1800 proceeds to step 1850 and ends in step 1855.

In one embodiment, the request for advertising is implicit in a request for user sidebar preference information, and an advertisement or advertisements are transmitted to the user with their sidebar preferences. In one embodiment, a sidebar module 1422 predetermines the advertisements that will be sent to a sidebar 1473 user, from the personal user information already available to the provider side sidebar module 1422, and transmits the predetermined advertisements to the user with the user's sidebar preferences. In one embodiment, a plurality of advertisements can be sent to a sidebar 1473 for slidesheets and/or for the main sidebar window. The sidebar application 1473 can determine which advertisements to display based on the user's actions, and/or based on time.

Figure 19:
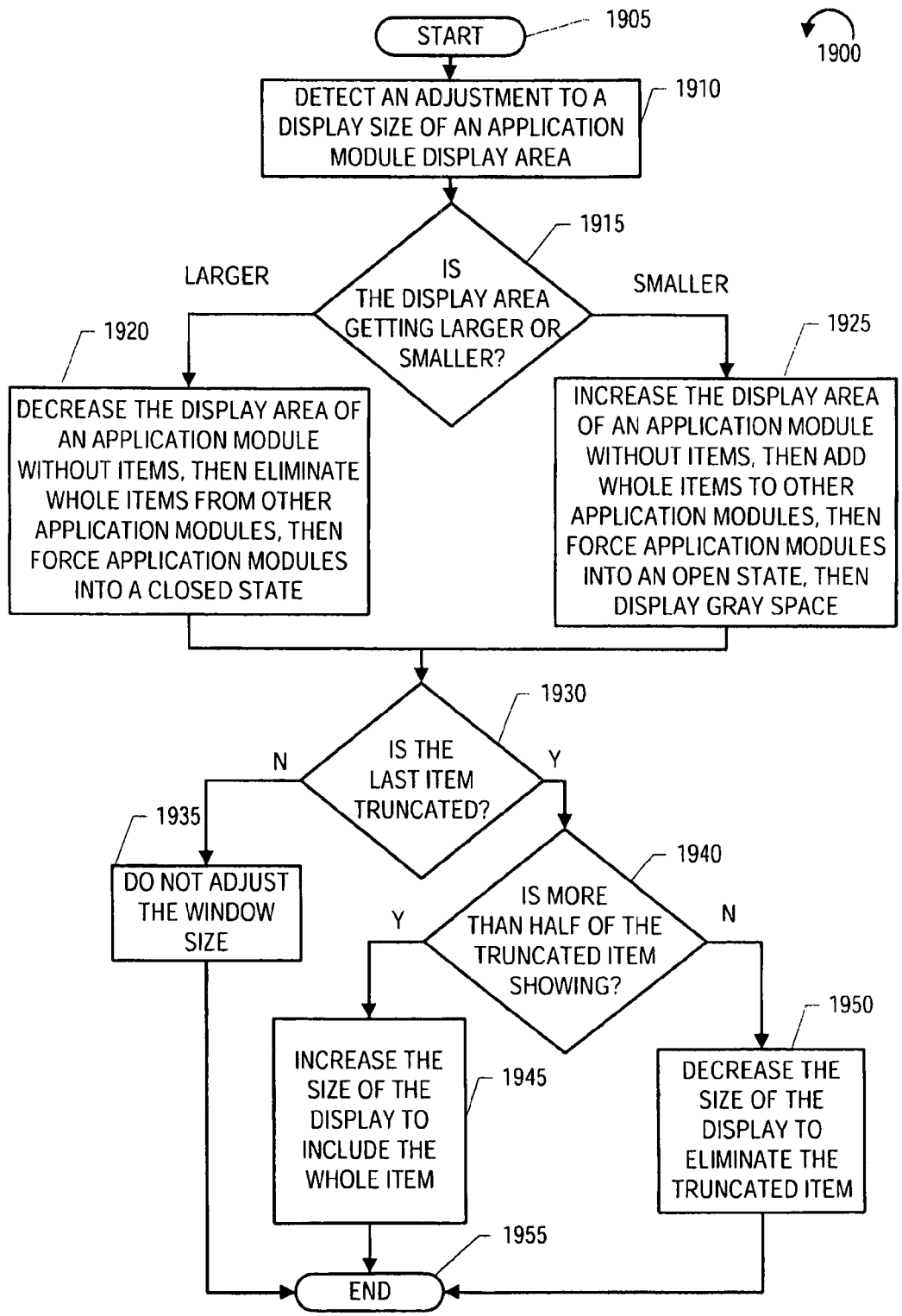
FIG. 19 illustrates a method for displaying a whole number of items in application modules of a sidebar.

In order to provide enhanced usability and a cleaner display, sidebars 1473 and/or slidesheets that comprise application modules with items will comprise, in one embodiment, a whole number of items (e.g., not fractionally or partially displayed). FIG. 19 illustrates a method 1900 for providing whole menu items in a sidebar 1473 and/or slidesheets. Method 1900 starts in step 1905. Then in step 1910, the sidebar detects an adjustment to the size of a display area of an application module.

Following step 1910, method 1900 proceeds to step 1915, where the application module display area can be increasing or decreasing in size. If the display area is getting larger, method 1900 proceeds down the "larger" path to step 1920. In step 1920, in order to accommodate the larger display area, the sidebar 1473 will first decrease the display area of application modules without items, such as, for example, a photo module and a notepad module. Then the sidebar 1473 will eliminate whole items from other application modules with items. If all other application modules have been decreased to their minimum, the sidebar will then force application modules into a closed state. Following step 1920, method 1900 proceeds to step 1930.

Returning to step 1915, if the display area is decreasing in size, method 1900 proceeds down the "smaller" path to step 1925. In step 1925, the sidebar 1473 first increases the display area of application modules without items. Then the sidebar 1473 adds whole items to other application modules. If there is no more application module information to display, then the sidebar forces application modules in a closed state into an open state. If there are no application modules left in a closed state, then the sidebar can display gray space. Method 1900 proceeds to step 1930.

In both steps 1920 and 1925, sidebar 1473 records which modules were affected by the user's resizing action and the original state of the module, so that the sidebar 1473 can restore the affected modules to their original state as space becomes available.

In step 1930, once the user stops resizing, the sidebar determines whether the last item in the resized application module display area has been truncated. If the last item has not been truncated, method 1900 proceeds to step 1935, where no adjustments are made, and method 1900 ends in step 1955.

Returning to step 1930, if the last item in a resized application module display area has been truncated, method 1900 proceeds to step 1940, where the sidebar determines if more than half of the truncated item is showing. If more than half of the truncated item is showing, method 1900 proceeds to step 1945, where the sidebar increases the size of the display area to include the whole truncated item. Method 1900 ends in step 1955.

Returning to step 1940, if less than half of the truncated item is showing, method 1900 proceeds to step 1950, where the sidebar decreases the size of the display area to eliminate the truncated item. The threshold level for adding or eliminating an item is not limited to one half of an item and can be any percentage of an item. In one embodiment, an item is eliminated if less than three quarters of the item is showing. Then method 1900 ends in step 1955.

Figure 20:
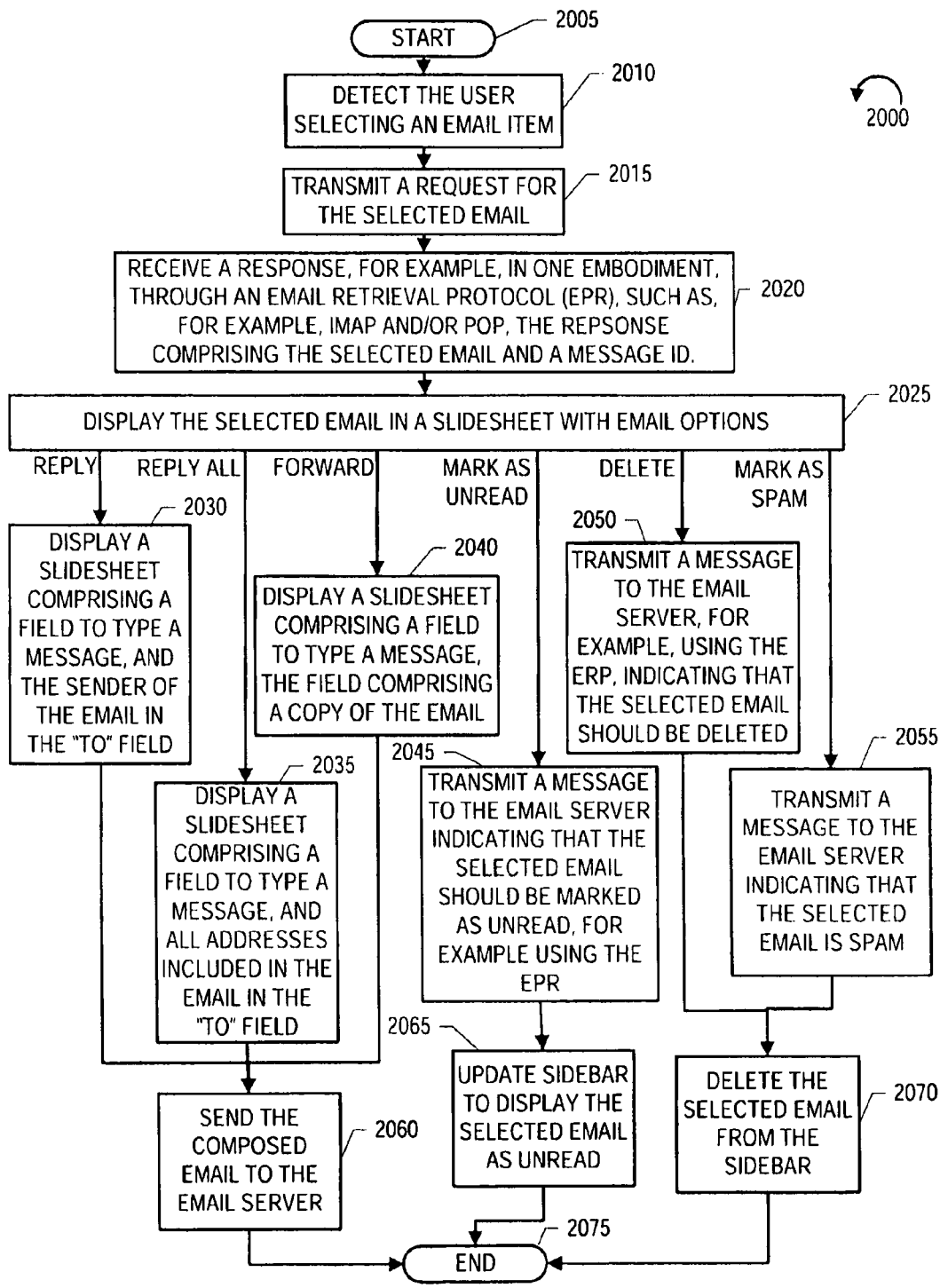
FIG. 20 illustrates an email application implemented according to one embodiment of the invention.

In one embodiment of the invention, the user can have an email application module in their sidebar 1473. FIG. 20 illustrates method 2000, implemented according to one embodiment of the invention, for displaying emails through a sidebar 1473. Before the start of method 2000, an email module of a sidebar 1473 can default to an email service offered by the sidebar provider. In one embodiment, the email module of the sidebar 1473 retrieves a user's unread emails and displays them to the user.

Method 2000 starts at step 2005. Then in step 2010, the sidebar 1473 detects the selection of an email item by a user. Following step 2010, method 2000 proceeds to step 2015, where the sidebar 1473 transmits a request, for example, to an IMAP server, for the selected email. Then in step 2020, the sidebar receives the selected email.

Some email services are Internet based and users interact with the email service through a webpage. The webpage allows the user to access and manipulate their messages. An application, such as, for example, the sidebar 1473 does not need to access a user's email through a web interface, since it is a computer and it displays the user's email messages in its own format. Thus, in one embodiment, the email retrieval computer 1483 may use an email retrieval protocol (ERP), such as, for example, Internet Message Access Protocol (IMAP) and/or Post Office Protocol (POP) to retrieve email messages. Some Internet content provider email services use a central message storage computer 1484 to save their user's email messages, and provided different avenues of access to the email, such as, IMAP, POP, webmail, etc. These services can be provided through one or more computers operated by the content provider.

In one embodiment, the content provider assigns one or more identifiers to messages stored in its central storage computer 1484. For example, a message may require more than one identifier since different email access programs use different identifier. In one embodiment, a message is given an IMAP ID and a web message ID.

In one embodiment, the sidebar 1473 uses IMAP to retrieve messages through an IMAP server 1483. When the sidebar 1473 requests messages from the IMAP server 1483 the IMAP server 1483 connects to the central storage computer 1484 to retrieve the requested message. In one embodiment, the IMAP protocol provides flags that can be used to indicate a state of a message, for example, read, unread, deleted, answered, and other states. Therefore, the sidebar 1473 can use IMAP to communicate certain user activities to the central storage computer. Other activates, such as, for example, marking a specific email as spam, use a message's web message ID, which is not part of the standard IMAP protocol. Therefore, marking emails as spam cannot be accomplished using a standard IMAP implementation. In known embodiments, IMAP does not include a default field for transmitting a web message ID. Thus, in one embodiment, a field comprising the web message ID is added to an extensible section of the IMAP protocol.

So, when the sidebar 1473 retrieves messages through the IMAP server 1483, the web message ID field is used to provide the web message IDs for retrieved messages. In one embodiment, if a user identifies an email as spam for the sidebar 1473, the sidebar 1473 can use the web message ID to identify the spam message to the web based email server 1436. In one embodiment, spam controls may be performed by another computer or another company.

Strengthening spam controls through a sidebar is one embodiment of the use of sending additional information through an ERP.

After the sidebar 1473 receives the requested email in step 2020, the sidebar 1473, in step 2025, displays the received email in a slidesheet. The slidesheet can comprise various email options, such as, for example, reply, reply to all, delete, mark as unread and mark as spam.

If the user selects a reply option, method 2000 proceeds to step 2030, where the sidebar displays a slidesheet comprising a field to type a reply message and the sender of the email in the "to" field. Then method 2000 proceeds to step 2060, where the composed email is sent to the email server. Then method 2000 ends in step 2075.

Returning to step 2025, if the user selects a reply all option, method 2000 proceeds to step 2035, where the sidebar displays a slidesheet comprising a field to type a reply to all message, and all the addresses in the email in the "to" field. Then method 2000 proceeds to step 2060, where the composed email is sent to the email server. Then method 2000 ends in step 2075.

Returning to step 2025, if the user selects a forward option, method 2000 proceeds to step 2040, where the sidebar 1473 displays a slidesheet comprising a field to type a message and a copy of the original email. The slidesheet also comprises a "to" field for the user to enter email recipients. Then method 2000 proceeds to step 2060, where a composed email is sent to the email server. Then method 2000 ends in step 2075.

For the reply, reply to all and forward email options, in one embodiment, the sidebar 1473 can send a composed message to the email server and/or an SMTP server for delivery and the sidebar 1473 can use IMAP to mark an email as answered. In one embodiment, the sidebar can use IMAP to save a copy of the sent email to a user's "sent mail" folder. In one embodiment, the sidebar 1473 can send a composed message to an email server for delivery using HTTP. The sidebar can also send the email's web message ID, so that the web server knows which email to mark as answered. In one embodiment, the sidebar 1473 can launch the user's default email application and direct the user to use the full service counterpart email application to perform the selected option.

Returning to step 2025, if the user selects the mark as unread option, method 2000 proceeds to step 2045, where the sidebar 1473 transmits a message to the email server, indicating to the server that the selected email should be marked as unread. Following step 2045, method 2000 proceeds to step 2065, where the sidebar is updated to display the selected email as unread. This may require adding the email back into the main sidebar 1473 window and adjusting a counter in the email module titlebar. Then method 2000 ends in step 2075.

Returning to step 2025, if the user selects the delete option, method 2000 proceeds to step 2050, where the sidebar transmits a message to the email server, indicating that the selected email should be deleted. Following step 2050, method 2000 proceeds to step 2070, where the selected email is deleted from the sidebar. Then method 2000 ends in step 2075.

Marking an email as unread or deleting an email, in one embodiment, can be updated using IMAP.

Returning to step 2025, if the user selects the mark as spam option, method 2000 proceeds to step 2055, where the sidebar transmits a message to the email server, indicating that the selected email should be marked as spam. Following step 2055, method 2000 proceeds to step 2070, where the selected email is deleted from the sidebar 1473. Then method 2000 ends in step 2075. Since the user's email server receives the spam indication, email identified as spam by the user through the sidebar 1473 increases the overall robustness of the user's spam controls. In one embodiment, as mentioned above, the message to the email server comprises a web message ID, so that the email server can identify which message was selected as spam by the user. The sidebar 1473 received the web message ID through a field added to the IMAP protocol.

Figure 21:
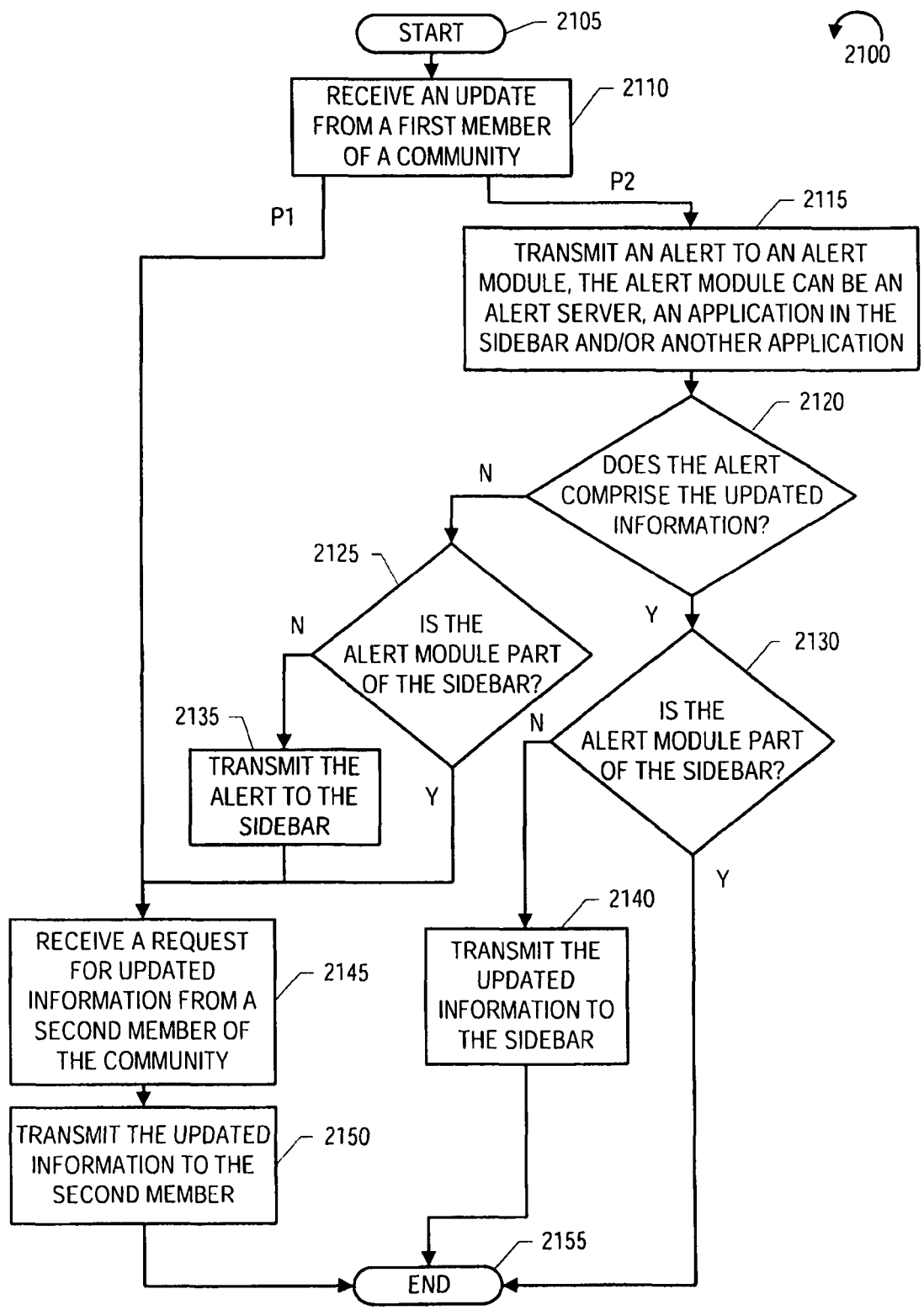
FIG. 21 illustrates a community activity updating application implemented according to one embodiment of the invention.

The sidebar 1473 can also be used to receive updates from community members. FIG. 21 illustrates a method 2100 for receiving community updates through a sidebar 1473. Method 2100 starts in step 2105. Then in step 2110, a community service server receives an update from a first community member. Following step 2110, method 2100 can proceed down path P1 or P2, depending on how the sidebar 1473 is configured or set up.

If the sidebar 1473 is set up to poll community service servers for updated information, method 2100 proceeds to step 2145, where the community service server receives a request for updated information from a sidebar 1473. Then in step 2150, the community service server transmits any updated information to the requesting sidebar 1473. Method 2100 ends in step 2155. In one embodiment, the updated information can be a review of a new movie, for a blast from a social networking friend.

Returning to step 2110, if the sidebar 1473 is set up to receive alerts, method 2100 proceeds to step 2115, where the community service server transmits an alert to an alert module 1439. In one embodiment, the alert module 1439 can be part of an alert server. In one embodiment, the alert module 1439 can be part of the sidebar 1473. In one embodiment, the alert module 1473 can be part of another application, such as, for example, an instant messaging application.

Following step 2115, method 2100 proceeds to step 2120, where the alert module determines whether the alert comprises the updated information. If the alert does not comprise updated information, method 2100 proceeds to step 2125. In step 2125, if the alert module is not part of the sidebar 1473, method 2100 proceeds to step 2135, where the alert module 1439, whether it is part of an alert server or part of another application loaded on the user's computer 1450, transmits the alert to the sidebar 1473. Then method 2100 proceeds to step 2145. Returning to step 2125, if the alert module is part of the sidebar 1473, then method 2100 proceeds directly to step 2145. After step 2145 (described above), method 2100 then proceeds to step 2150 (described above) and ends in step 2155.

Returning to step 2120, if the alert comprises the updated information, for example, receiving a new email would alert the sidebar 1473 to the fact that a new email has been received. Following step 2120, in step 2130, if the alert module 1439 is not part of the sidebar 1473, method 2100 proceeds to step 2140, where the updated information is transmitted to the sidebar 1473. Then method 2100 ends in step

2155. Returning to step 2130, if the alert module 1439 is part of the sidebar 1473, method 2100 ends in step 2155.

Figure 22:
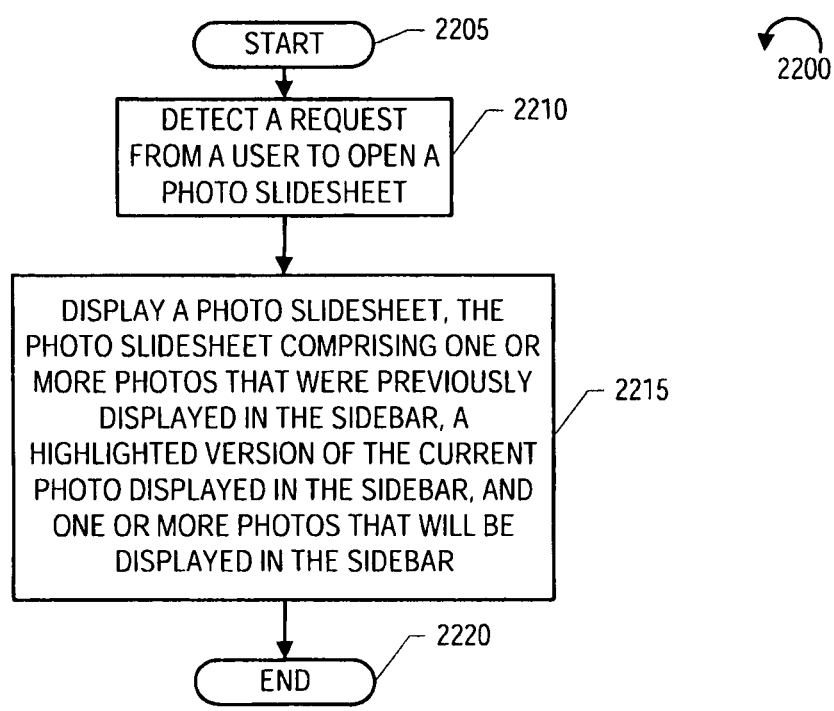
FIG. 22 illustrates a photo displaying method implemented according to one embodiment of the invention.

FIG. 22 illustrates a method 2200 for displaying photos in a slidesheet implemented according to one embodiment of the invention. Method 2200 starts in step 2205. Then, in step 2210, the sidebar 1473 detects a request from a user to open a photo slidesheet. Following step 2210, method 2200 proceeds to step 2215, where the sidebar 1473 displays a photo slidesheet. In one embodiment, the photo slidesheet comprises the current photo displayed in the sidebar 1473, one or more photos previously displayed in the sidebar 1473 and one or more photos that will be displayed in the sidebar 1473. In one embodiment, the current photo is highlighted in some manner, such as, for example, using a border and/or changing the brightness of the photo. Method 2200 ends in step 2220.

Figure 23:
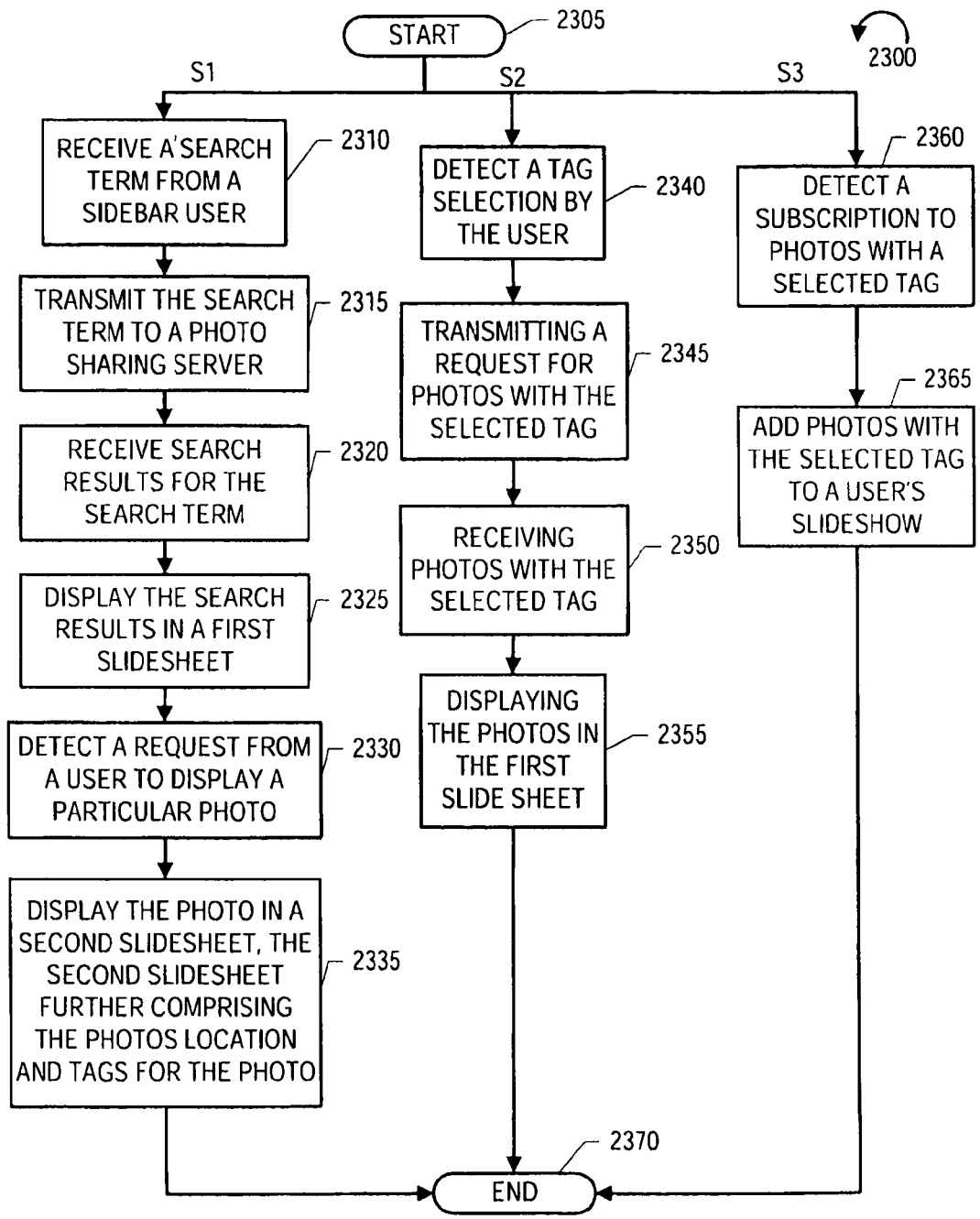
FIG. 23 illustrates a photo sharing method implemented according to one embodiment of the invention.

FIG. 23 illustrates a method 2300 for displaying photos from an Internet photo sharing service, such as, for example Flickr (a service of Yahoo!, Inc. of Sunnyvale, Calif.). Depending on the option that a user selects, method 2300 can proceed down a plurality of different paths.

If the user desires to search for new photos, method 2300 proceeds down path S1 to step 2310, where the sidebar 1473 receives a search term from the user. In one embodiment, the search term can be received from a search field in a photo slidesheet. In one embodiment, the search term can be received from a search field in a photos options dialog. Following step 2310, method 2300 proceeds to step 2315 where the sidebar 1473 transmits the search term to a photo sharing server. A photo sharing server receives the search term and retrieves photos associated with the search term. Following step 2315, in step 2320, the sidebar 1473 receives search results from the photo sharing server. Then in step 2325, in one embodiment, the sidebar 1473 displays the search results in a first photo slidesheet. In one embodiment, the search results can be displayed in a dialog.

In one embodiment, the user can select one of the search results to display a larger version of the selected photo. Thus, in step 2330, the sidebar detects a request from a user to display a particular photo. Following step 2330, in step 2335, the sidebar 1473 displays the selected photo in an item level photo slidesheet. In one embodiment, the item level photo slidesheet further comprises metadata associated with the photo. The metadata can comprise a URL location for the photo and any tags that are associated with the photo. Then method 2300 ends in step 2370.

Returning to step 2305, the user can also search for photos through tags that are displayed in various slidesheets and display areas of the sidebar 1473. Thus method 2300 proceeds down path S2 to step 2340, where the sidebar 1473 detects a tag selection by the user. In one embodiment, the tag selection can be received from a drop down menu in the first photo slidesheet. In one embodiment, the tag selection can be received from a tag listed in the item level photo slidesheet. Following the detection of a tag selection, method 2300 proceeds to step 2345, where the sidebar 1473 transmits a request to a photo sharing server for photos with the selected tag. Following step 2345, in step 2350, the sidebar 1473 receives photos with the selected tag. Then in step 2355, the received photos are displayed in the first photo slidesheet. In one embodiment, the photos can be displayed in a dialog. Method 2300 ends in step 2370.

Returning to step 2305, a user can subscribe to a particular tag and thereby add photos with the particular tag to the slideshow in their sidebar 1473. When a user subscribes to a tag, method 2300 proceeds down path S3 to step 2360, where the sidebar 1473 detects a subscription to photos with a particular tag. In one embodiment, a subscription button can be display with search results. Thus, if the user likes the photos in a search result, they can easily add those photos to their slideshow. In step 2365, the photos with the selected tag are added to the user's photo slideshow. Method 2300 ends in step 2370.

Figure 24:
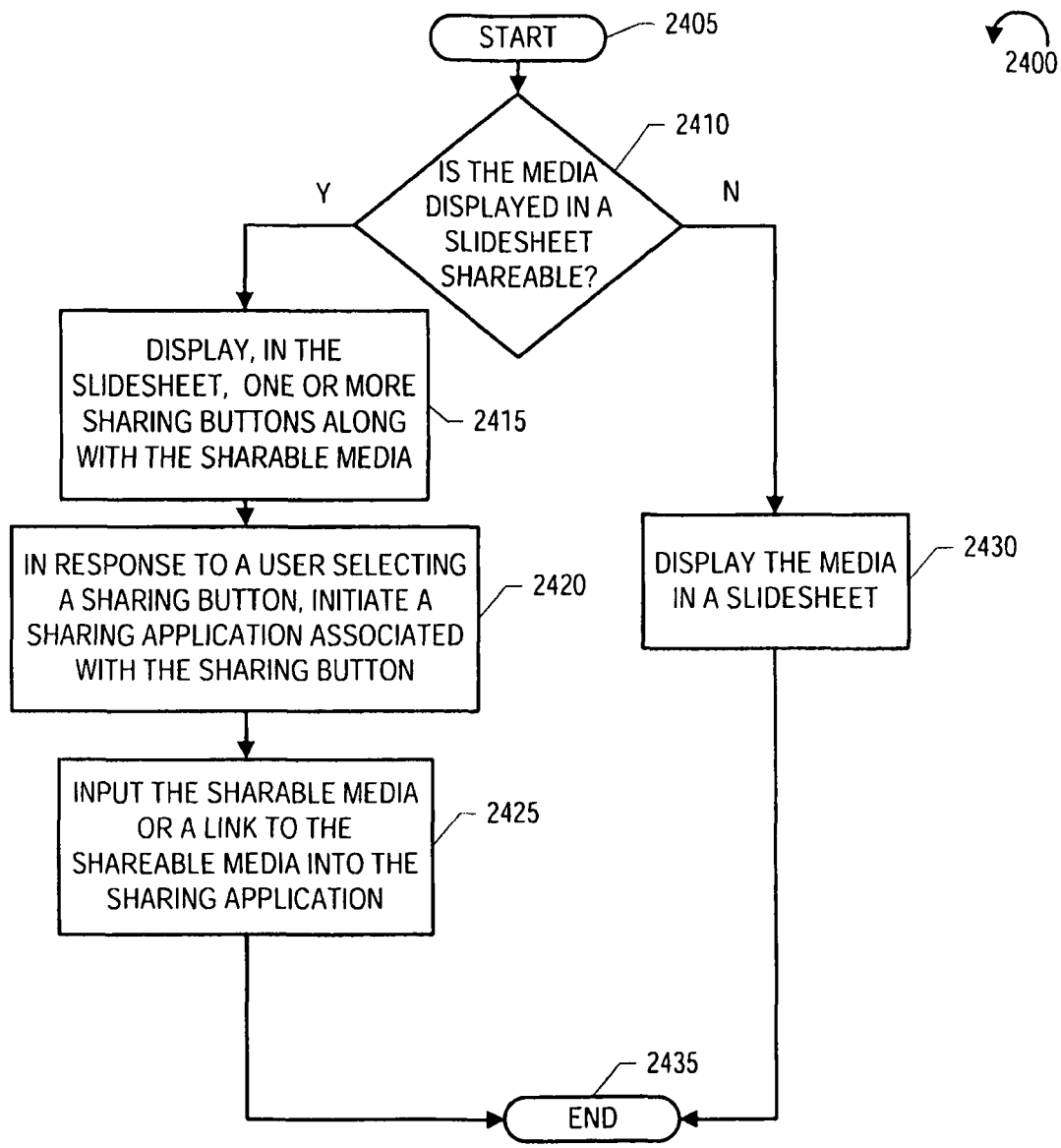
FIG. 24 illustrates a method for displaying sharing buttons with a shareable media implemented according to one embodiment of the invention.

In one embodiment, the sidebar 1473 can display various types of information, such as, for example, a photo, a video, an article, and other types of information, that the user may want to share with other people. Therefore, the sidebar 1473 can provide sharing buttons when it displays shareable media. FIG. 24 illustrates a method 2400 for placing sharing buttons in a slidesheet with shareable media. Method 2400 starts in step 2405. Then in step 2410, the sidebar 1473 determines whether the media displayed in a slidesheet is shareable. In one embodiment, shareable media is predetermined, and the sidebar 1473 is preprogrammed to add sharing buttons to a predetermined set of slidesheets. In one embodiment, the sidebar 1473 determines whether the displayed media is shareable, for example, by examining the type of media or the URL for the media.

If the media is shareable, method 2400 proceeds to step 2415, where the shareable media is displayed with one or more sharing buttons. In one embodiment, the sharing buttons can comprise an email button, an IM button, and a blog button. Following step 2415, method 2400 proceeds to step 2420, where in response to a user selecting a sharing button, a sharing application associated with a sharing button is initiated. For example, in one embodiment, when an email button is selected, a default email program for the computer is initiated. In one embodiment, when an IM button is selected, a default IM program is initiated. In one embodiment, when the blog button is selected, a browser opens to the user's default blogging service. In one embodiment, the user can set up a default blogging service through the sidebar 1473 options and have the media automatically added to the user's blog, when the button is selected.

Following step 2420, in step 2425, the shareable media or a link to the shareable media is sent to the sharing application so that the user can send the shareable media to other people. Then the method 2400 ends in step 2435.

Returning to step 2410, if the media displayed in a slidesheet is not shareable, method 2400 proceeds to step 2430, where the media is displayed in a slidesheet without sharing buttons. Some media may have copyright limitation that would prevent the distribution of the media. Then the method 2400 ends in step 2435.

It will be recognized that while the features and functions described above are described in relation to network components and user side components, such features and functions can be implemented at any point in the network, on single or multiple computers and/or servers, and network functions can also be duplicated at the user computer for functioning independent of the network if desired. Thus user side changes and or network side changes can be synchronized and or synchronized when a user returns to the network in manners known in the art or hereafter to become known.

While the description of the various embodiments of the invention are described in a server/client network environment, alternate embodiments of the invention can be performed in a peer-to-peer network or other interconnectivity schemes now known or hereafter to become known.

While there have been shown and described and pointed out fundamental novel features of the invention as applied to preferred embodiments thereof, it will be understood that various omissions and substitutions and changes in the form and detail of the disclosed invention nay be made by those skilled in the art without departing from the spirit of the invention. It is the invention, therefore, to be limited only as indicated by the scope of the claims appended hereto.

What is claimed:

1. A method comprising:
   detecting, by a sidebar provided by a content provider and executing on a computer, an update to an Internet community website, the update having been made by a member of the Internet community website, the Internet community website comprising a plurality of members, the member having a relationship to a user of the sidebar, the user being one of the plurality of members of the Internet community website, and a subscriber to the content provider;
   automatically obtaining user information stored for the user in a user database maintained by the content provider, said user information comprising user interest information corresponding to the user and behavioral information relating to recent actions performed by the user;
   automatically selecting, based on the automatically obtained user information and without user input at the computer, Internet community websites that the user will receive indicators for; and
   displaying an indicator in one of a plurality of modules of the sidebar, the plurality of modules being arranged in a vertical stack of modules, the vertical stack of modules comprising a tabbing structure that is tabbed according to content of each of the plurality of modules, the indicator being perceptible to the user, so that the user is alerted to the update by the member during interaction by the member and immediately upon the update occurring, the indicator providing an indication as to the activity performed during said interaction by the member.

2. The method of claim 1, further comprising receiving a selection, from the user, of the plurality of Internet community websites from which the user wished to receive updates.

3. The method of claim 1, wherein the step of detecting an update to an Internet community website comprises monitoring the user's incoming email for an email indicating that the update was made by the member.

4. The method of claim 3, further comprising in response to detecting an update indication email, initiating a search for an update in a second Internet community website, in which the user is a member.

5. The method of claim 1, wherein the step of detecting an update to an Internet community website comprises periodically polling the Internet community website for updates.

6. The method of claim 1, further comprising receiving a username and a password for a Internet community website not operated by the content provider, and wherein the username and password are used to access the Internet community website not operated by the content provider and detect an update.

7. The method of claim 1, wherein the step of detecting an update to an Internet community website comprises receiving an update alert from an alert module, the alert module being configured to detect updates to the Internet community website.

8. The method of claim 7, wherein the alert comprises at least some part of the updated information.

9. The method of claim 7, wherein the alert module is an alert server maintained by the content provider.

10. The method of claim 7, wherein the alert module is an operation executed by another computer application separate from the sidebar, the computer application being provided by the content provider.

11. The method of claim 1, wherein the Internet community website is operated by the content provider.

12. The method of claim 1, wherein the Internet community website is a social networking website comprising an individual webpage dedicated to each member.

13. The method of claim 1, wherein the Internet community website is a photo sharing site.

14. The method of claim 13, wherein the update is a new photograph.

15. The method of claim 13, wherein the update is a comment regarding a photograph.

16. The method of claim 1, wherein the Internet community website is a review site, and the update is a review.

17. The method of claim 1, further comprising receiving at least some part of the updated information, and including the received information into the indicator.

18. The method of claim 1, further comprising playing an audible sound when displaying the indicator.

19. A user interface comprising:
   a computing device, said computing device visibly displaying a user interface, visibly displayed on a desktop of the computer, the user interface comprising:
   an Internet community update application module, being visibly displayed as one of a plurality of sidebar application modules of a sidebar provided by a content provider and executing in memory of the computer, the plurality of modules being arranged in a vertical stack of application modules, the vertical stack comprising a tabbing structure tabbed according to content of each of the plurality of modules;
   and at least one item visibly displayed in the Internet community update application module, the item indicating an update to an Internet community website, the update having been made by a member of the Internet community website during interaction by the member and immediately upon the update occurring, the Internet community website comprising a plurality of members, the member having a relationship to a user of the sidebar, the user being one of the plurality of members of the Internet community website, and a subscriber to the content provider,
   wherein the Internet community update application module automatically obtains user information stored for the user in a user database maintained by the content provider, the user information comprising user interest information and behavior information relating to recent actions performed by the user, and automatically selects, based on the automatically obtained user information and without user input at the computer, Internet community websites that the user will receive indicators for.

20. The user interface system of claim 19, wherein at least some of the update is displayed in the item.

21. The user interface system of claim 19, wherein the Internet community website is a review site, and the item comprises a visible rating for whatever was reviewed.

22. The user interface system of claim 19, wherein the item further comprises an image identifying the member, so that the user can identify who made the update.

23. The user interface system of claim 19, wherein said user interface further comprising comprises a plurality of items filtered by an age of the update.

24. The user interface system of claim 19, wherein said user interface further comprising comprises a plurality of items filtered by community type.

25. The user interface system of claim 19, wherein said user interface further comprising comprises a slidesheet, displayed in response to the user selecting a control displayed in the Internet community update application module, the slidesheet comprising a list of items, the list comprising more items than the Internet community update application module.

26. The user interface system of claim 19, wherein said user interface further comprising comprises a slidesheet, displayed in response to the user selecting an item displayed in the Internet community update application module, the slidesheet comprising information related to the update.

27. The user interface system of claim 19, wherein the information related to the update comprises a link to contact the member who made the update.

28. The user interface system of claim 19, wherein the information related to the update comprises a link to an Internet community webpage, the Internet community comprising the update.

29. An Internet community update application module of a sidebar, the module implemented as coded instructions and executed from a memory, comprising:
  update detection computer code, the update detection computer code configured to detect an update to an Internet community website, the update having been made by a member of the Internet community website, the Internet community website comprising a plurality of members, the member having a relationship to a user of a sidebar provided by a content provider, the user being one of the plurality of members of the Internet community website, and a subscriber to the content provider; and
  update indicator computer code, the update indicator computer code configured to display an indicator in a module of the sidebar comprising a plurality of modules stacked vertically, wherein the vertical stack of modules comprises a tabbing structure that tabs the plurality of modules according to content of each of the modules, the indicator being perceptible to the user, so that the user is alerted to the update by the member during interaction by the member and immediately upon the update occurring, the indicator providing an indication as to the activity performed during said interaction by the member,
  wherein the update detection computer code automatically obtains user information stored for the user in a user database maintained by the content provider, the user information comprising user interest information and behavior information relating to recent actions performed by the user, and automatically selects, based on the automatically obtained user information and without user input at the computer, Internet community websites that the user will receive indicators for.

30. The Internet community update application module of claim 29, further comprising:
  user interaction computer code, the user interaction computer code configured to detect a clicking of an item of the Internet community update application module; and
  slidesheet computer code, the slidesheet computer code configured to display a slidesheet in response to the detection of the clicking of an item, the slidesheet comprising additional information related to the update.

* * * * *